United States Patent [19]
Morris et al.

[11] Patent Number: 5,324,035
[45] Date of Patent: Jun. 28, 1994

[54] VIDEO GAMING SYSTEM WITH FIXED POOL OF WINNING PLAYS AND GLOBAL POOL ACCESS

[75] Inventors: Earl D. Morris; Rolen Miller, both of Albuquerque; Michael J. Dietz, Peralta, all of N. Mex.

[73] Assignee: Infinational Technologies, Inc., Omaha, Nebr.

[21] Appl. No.: 988,429

[22] Filed: Dec. 1, 1992

Related U.S. Application Data

[63] Continuation-in-part of Ser. No. 801,801, Dec. 2, 1991, abandoned.

[51] Int. Cl.⁵ ............................ A63F 1/00; A63F 9/22
[52] U.S. Cl. ................................ 273/138 A; 273/139; 273/439
[58] Field of Search ............... 273/138 A, 139, 269, 273/85 CP, 439, 143 R, DIG. 28; 364/410, 412

[56] References Cited

U.S. PATENT DOCUMENTS

| | | |
|---|---|---|
| 3,395,463 | 4/1966 | Worden et al. |
| 3,671,040 | 6/1972 | Meyer et al. |
| 3,671,041 | 6/1972 | Taylor et al. |
| 4,072,930 | 2/1978 | Lucero et al. ............ 364/412 |
| 4,221,571 | 9/1980 | Rhoades |
| 4,283,709 | 8/1981 | Lucero et al. |
| 4,305,131 | 12/1981 | Best |
| 4,332,389 | 6/1982 | Loyd, Jr. et al. |
| 4,365,810 | 12/1982 | Richardson |
| 4,378,940 | 4/1983 | Gluz et al. |
| 4,455,025 | 6/1984 | Itkis |
| 4,467,424 | 8/1984 | Hedges et al. |
| 4,494,197 | 1/1985 | Troy et al. ............ 364/412 |
| 4,517,656 | 5/1985 | Solimeno et al. |
| 4,624,462 | 11/1986 | Itkis |
| 4,634,845 | 1/1987 | Hale et al. |
| 4,636,951 | 1/1987 | Harlick |
| 4,652,998 | 3/1987 | Koza et al. ............ 364/412 |
| 4,679,143 | 7/1987 | Hagiwara |
| 4,805,907 | 2/1989 | Hagiwara |
| 4,837,728 | 6/1989 | Barrie et al. |
| 4,856,787 | 8/1989 | Itkis |
| 5,007,649 | 4/1991 | Richardson |
| 5,042,809 | 8/1991 | Richardson ............ 273/138 A |

FOREIGN PATENT DOCUMENTS

| | | |
|---|---|---|
| 2656024 | 6/1978 | Fed. Rep. of Germany |
| 2059270 | 4/1981 | United Kingdom |
| 2147773A | 5/1985 | United Kingdom |
| 2148135 A | 5/1985 | United Kingdom |

Primary Examiner—Jessica J. Harrison
Attorney, Agent, or Firm—Willian Brinks Hofer Gilson & Lione

[57] ABSTRACT

A gaming system is provided including a central game processor, a plurality of master processing units and a plurality of slave terminals operable by players to play the game. The central game processor communicates with the master processing units and supplies the various games available in the system. The master processing units store and administer the games as they are played on the slave terminals connected to each respective master processing unit. A preferred game includes a fixed pool of game plays and a predetermined number of winning plays within each pool. Each player, through his or her slave terminal, can purchase plays in each fixed pool stored in the master processing unit to which that terminal is coupled. When a particular pool is exhausted, for example, through the purchase of all plays, the central game processor provides another fixed pool of plays to that master processing unit to enable continuous play.

18 Claims, 21 Drawing Sheets

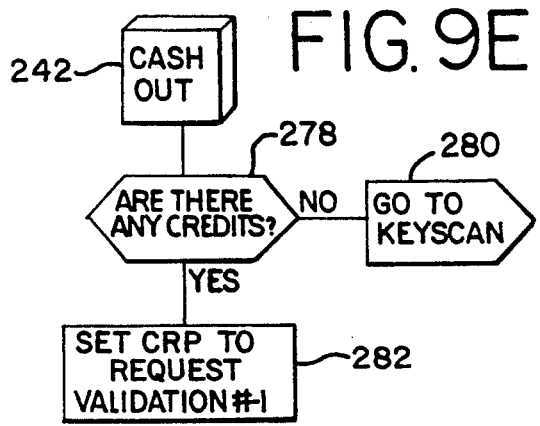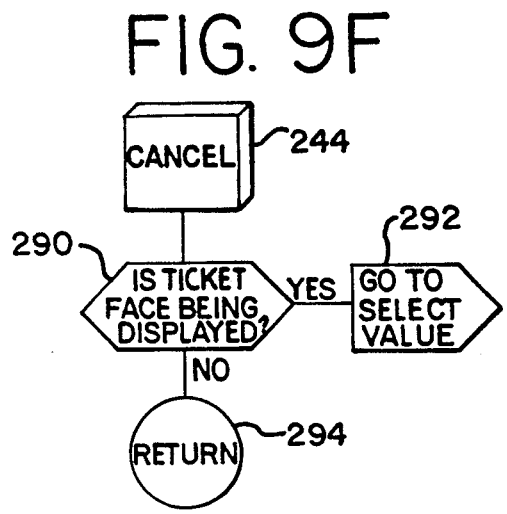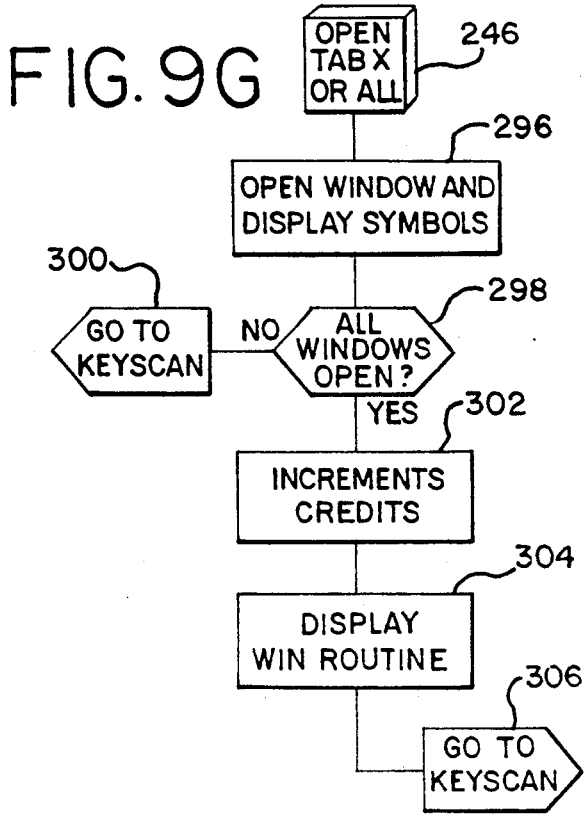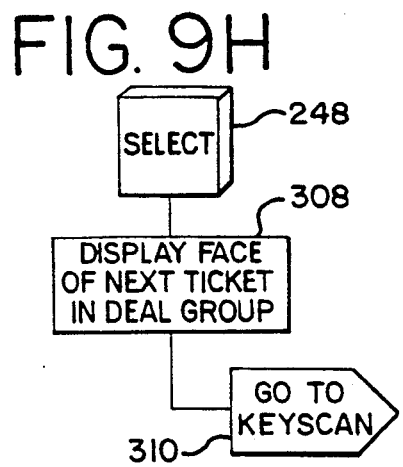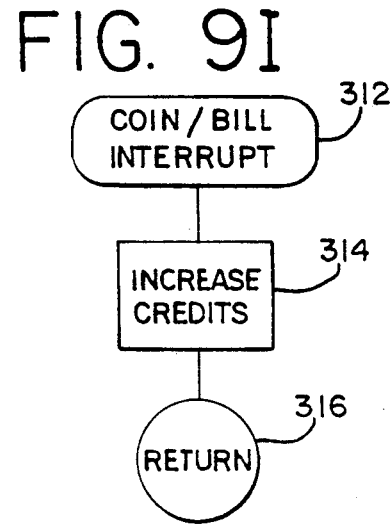

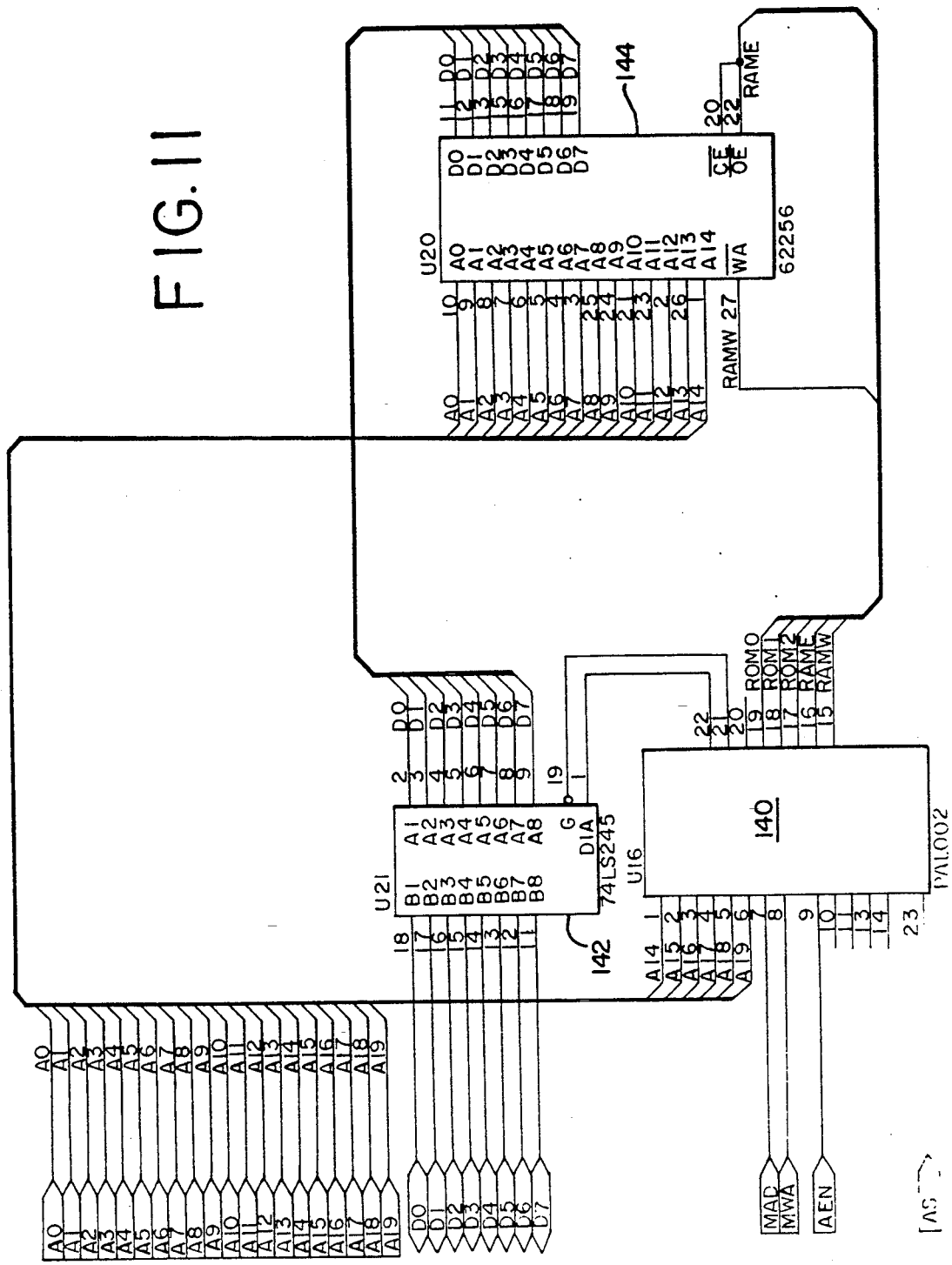

GET TICKET DISPLAY

FIG. 18
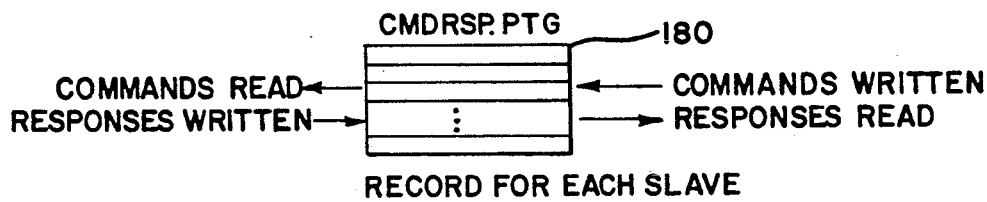
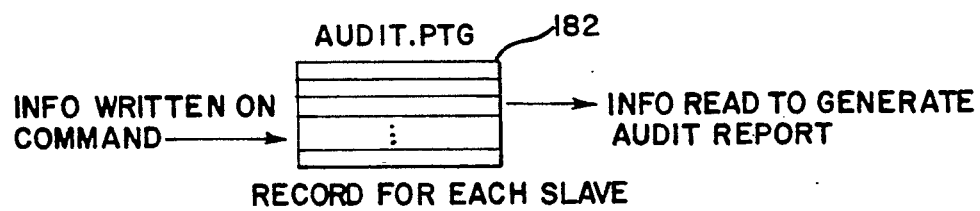
SLAVE             MASTER
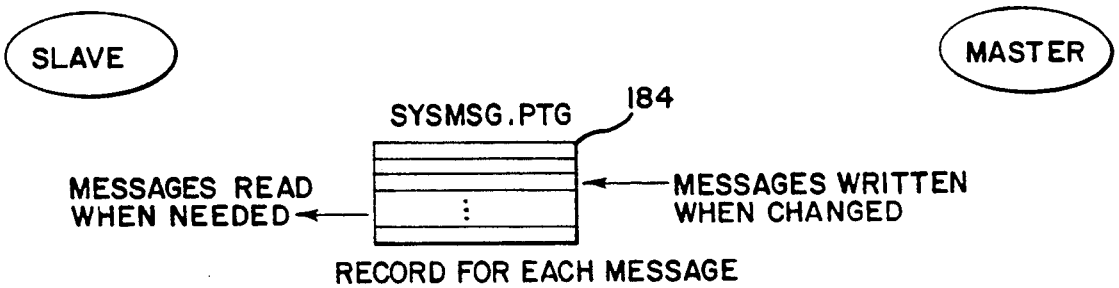
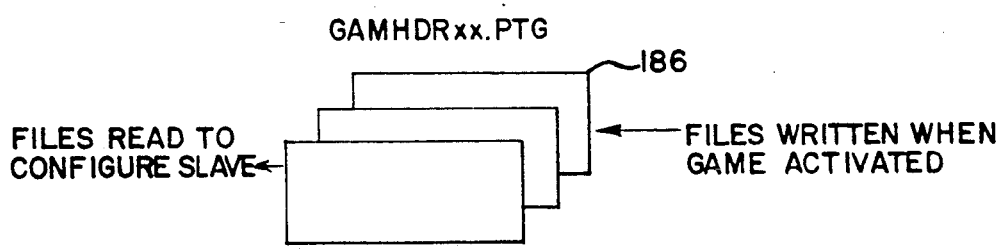

VIDEO GAMING SYSTEM WITH FIXED POOL OF WINNING PLAYS AND GLOBAL POOL ACCESS

This application is a continuation-in-part of application Ser. No. 07/801,801, filed Dec. 2, 1991, now abandoned, the contents of which are hereby incorporated by reference.

This patent document makes reference to a microfiche appendix, which includes a listing of the object code version of the software for practicing one presently preferred embodiment of the invention. The microfiche appendix includes two microfiche having a total of 192 frames.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copy right rights whatsoever.

FIELD OF THE INVENTION

This invention relates to video lottery games and other video games of chance, and in particular, to a video gaming system providing games including a fixed pool of game plays and a predetermined number of winning plays within each pool.

BACKGROUND OF THE INVENTION

Lottery games where a player purchases a printed ticket and gambles on winning a prize or sum of money are known in the art. Lottery games of this type, however, generally require little or no skill on the part of the player to play the game. At most, some minimal physical act may be required of the player to reveal a preordained outcome included on the ticket. The outcome of the ticket has likely been determined in advance of the purchase, usually at the time the tickets are printed. In these games, a player can determine immediately whether the ticket was a winning ticket by simply examining the face of the ticket.

Other lottery-type games that require additional, non-skilled acts on the part of the player are also known. These games may involve the scratching of a removable surface deposited on the face of the ticket in order to reveal whether the ticket constitutes a winning hand. The information printed on the ticket will usually also indicate the amount of any prize won. In paper pull-tab versions of this type of lottery game, the player may peal back or tear off a paper covering to determine if the ticket was a winner. Even this version of the lottery ticket, however, lacks a sense of competition between other players or any feeling that a player can affect the outcome of the game.

The recent proliferation of the video game has provided greater reach or marketability for such lottery or gambling devices. Video games of chance, such as video poker or video black jack, are examples of such video gambling machines. These video games are very accessible and can be installed in bingo parlors or gambling halls so that many players can play at one time.

Even where these video lottery games or gambling devices have succeeded in attracting more players, they also have lacked an element of competition whereby a player can compete not simply against a machine, but against other players as well. Such competition would provide an element of thrill to the known lottery game, or even require a degree of skill from a player. In the prior paper lottery systems or video gambling machines, the player essentially competes against the machine and has no indication that other players are also competing to win the same or different prizes.

What is lacking, therefore, is a lottery game that would overcome the above disadvantages of the previous lottery systems and would provide the advantages of the now popular video games. These advantages include greater access to more players, ease of operation and administration, and minimal overhead in the form of human administrators. Such a video lottery system would also provide a game where players could directly compete against each other and thus have an impact on their chances of winning.

One video lottery game is described in U.S. Pat. No. 4,652,998, but lacks this element of competition between players. According to the patent, a pool of tickets is produced and divided into mini-pools among multiple terminals operable by various players. Each mini-pool includes a fixed ratio of winning tickets that are allocated from the greater pool. However, each player only purchases plays from the respective mini-pool allocated to his terminal and gambles on the random nature of prize distribution within that pool. Simultaneous competition against other players is not provided.

If a degree of competition were provided to this video lottery system, a level of skill and the thrill of competition with others, would advantageously be added. Competing with other players at the same, or even a remote, location adds an element of fun not provided in the previous gaming systems described above.

SUMMARY OF THE INVENTION

In view of the above, a master processing unit is provided that includes a memory device. The memory device is employed to store a fixed pool of game plays, where each fixed pool of plays includes a predetermined number of winning plays. Coupled to the master processing unit are a plurality of slave terminals that communicate with the master processing unit. Each slave terminal also is equipped with a player-controlled selection device employed to request game plays from the fixed pool of game plays stored at the master processing unit. Play of the games progresses as each player purchases game plays through the slave terminals from the whole pool of game plays stored at the master processing unit until the fixed pool of game plays is exhausted.

In one aspect of the invention, a central game processor is also provided, which generates and supplies the fixed pools of game plays to the master processing unit. The central game processor is coupled to the master processing unit through a communication interface. In another aspect of the invention, a plurality of master processing units are provided. Each master processing unit is coupled to the central game processor, and each master processing unit communicates with a plurality of slave terminals coupled to that master processing unit.

The preferred embodiments described below combine the advantages of the prior paper lottery systems with the ease and popularity of the video game. As in the paper lottery systems, each player purchases a video lottery play from a fixed pool of such plays. As in the paper lottery systems, each game play has a predetermined chance of winning. The video lottery system, however, has the advantage of continuously updating each player on the chances of purchasing one of the remaining winning plays in the pool. Use of computers and video terminals also affords on-line competition among the many players that can simultaneously play the lottery games at the same or remote locations.

In the preferred embodiment, many players are capable of simultaneously competing against each other for a predetermined number of winning plays provided in a fixed pool of lottery game plays. Such competition urges players to race in order to purchase the remaining winning plays within each fixed pool of plays before none remain. An element of strategy and skill is thus introduced since a player may decide to wait for the odds of purchasing a winning play to increase by allowing other competitors to purchase some of the remaining non-winning plays, thereby increasing the odds of purchasing a winning play at a later time. Displaying on a continuous basis the number of remaining plays and the number of winning plays already redeemed allows each player to assess the risk in purchasing another play or whether to cease playing until a new game is initiated.

These and other features and advantages will be apparent upon consideration of the following detailed description of the presently preferred embodiments of the invention, taken in conjunction with the appended drawings.

BRIEF DESCRIPTION OF THE DRAWINGS

FIG. 9 is one presently preferred flow chart of the functions performed on the slave terminal shown in FIG. 8, where FIG. 9E illustrates flow of the cash out subroutine, FIG. 9F illustrates flow of the transaction cancel subroutine, FIG. 9G illustrates flow of the open single tab or open all tabs subroutine, FIG. 9H illustrates flow of the select ticket subroutine and FIG. 9I illustrates the wager deposit subroutine;

FIGS. 10–13 are preferred circuit diagrams of a general purpose input/output interface adapter employed in the slave terminal shown in FIG. 8, where FIGS. 10A and 10B together show signal decoding circuitry, FIG. 11 shows the memory logic, FIG. 12 shows sound generation circuitry and FIGS. 13A and 13B together illustrate the input/output interface;

FIG. 18 is a graphic depiction of the master/slave communication files; and

DETAILED DESCRIPTION OF THE PRESENTLY PREFERRED EMBODIMENTS

Figure 1:
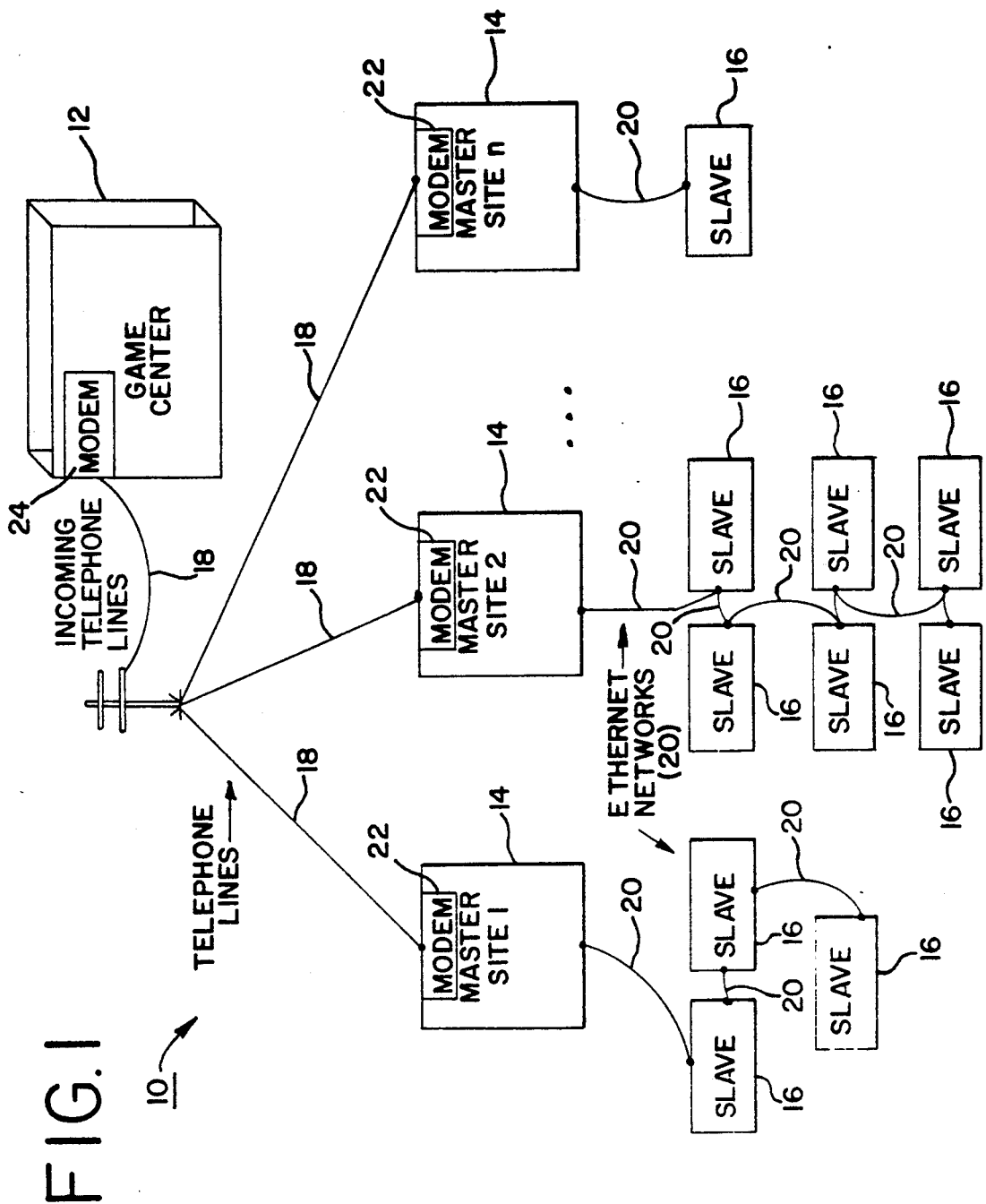
FIG. 1 is a block diagram of one preferred gaming system made according to the invention.

Reference is now made to the drawings where like elements are identified by like numerals throughout. FIG. 1 shows a gaming system made according to a preferred embodiment of the invention, generally designated at 10. The gaming system 10 includes a central game processor 12, which controls and administers operation of the gaming system 10. Preferably, remotely located from the central game processor 12 are multiple master processing units 14. In one embodiment of the invention, the master processing units 14 are connected to the central game processor 12 employing a telephone link. In this embodiment, up to sixteen telephone lines 18 are used to connect between modems 22 provided with each master processing unit 14 and the multiple-line modems 24 provided in the central game processor 12.

A plurality of slave terminals 16 are in turn connected to each master processing unit 14. According to the preferred embodiment, up to twenty slave terminals 16 can be configured to each master processing unit 14. In this embodiment, the slave terminals 16 are interconnected through a local area network (LAN) 20. The local area network 20 also couples the slave terminals 16 to their respective master processing unit 14.

Although a preferred system configuration has been described, it will be appreciated by those skilled in the art that a number of different system configurations are possible without departing from the spirit and scope of the invention. As will be appreciated, the combination of components provided in the gaming system 10 comprises an integrated computer system capable of operating an electronic lottery/gambling system or other similar games. Each component of the gaming system 10 provides a specific function necessary to operation of the gaming system 10 as a whole. However, these functions can be further distributed or combined among other computer architectures.

As will be described more fully below, each element of the system 10 (the central game processor 12, the master processing units 14, and the slave terminals 16) also executes one or more computer programs in order to perform their respective tasks. The preferred computer programs addressed below may also take on different forms without departing from the spirit and scope of the invention.

The purpose of the central game processor 12 is twofold: (1) the central game processor 12 electronically generates each fixed pool of game plays provided on the gaming system 10, and (2) serves as an interface to each master processing unit 14. The central game processor 12 thus acts as a repository for, and coordinates the production of, graphic data and game play information. The central game processor 12 supplies, or downloads, the fixed pools of game plays to each master processing unit 14, and also performs periodic audit and security checks of the master processing units 14.

Each master processing unit 14 also contributes a unique function to the gaming system 10. The purpose of the master processing units 14 is primarily to manage the game plays being requested at the slave terminals 16. The master processing units 14 administer the games as they are being played at the slave terminals 16. In the administration of the games, the master processing units 14 provide audit information about each of the slave terminals 16 to the central game processor 12. The master processing units 14 also handle the summation and termination of each player's game play by calculating each player's winnings and providing the player with a receipt.

The slave terminals 16 provide the player interface to the gaming system 10. The purpose of each slave terminal 16, therefore, is to handle and process game play requests from each player. Each slave terminal 16 keeps track of each player's winnings and serves as a repository for each player's wagers. As part of the player interface, each slave terminal 16 detects if the game play currently requested by a player constitutes a winning play, and if so, displays to the player the amount won.

One objective of the presently preferred gaming system 10 is to simulate, through a video game embodiment, the action and play of a paper pull-tab lottery game. The gaming system 10, however, is also capable of supplying a variety of other games including more sophisticated games. Examples of such games include poker, slot machines, progressive games, Pai Gow, black jack, keno, bingo, craps, roulette and Red Dog.

According to the preferred embodiment of the invention, several players are capable of participating and simultaneously playing the games provided by the gaming system 10. Each player participates by purchasing plays through a respective slave terminal 16. Each master processing unit 14 maintains a fixed pool of game plays supplied from the central game processor 12 to be transmitted to the slave terminals 16. Thus, as in the paper pull-tab lottery games, each player has access to and can purchase plays from the entire fixed pool of game plays stored at each master processing unit 14. Through the use of a player-controlled selection device (e.g., pushbuttons or the like) a player can request and purchase game plays and gamble on purchasing a winning play. Each player's activities, therefore, bear a direct result on the outcome of purchasing subsequent plays from the fixed pool of game plays stored at the master processing units 14.

In the preferred embodiment, it is important that each game retain the play and feel of the paper pull-tab lottery games. Thus, each player is continuously alerted regarding how many plays remain in each fixed pool. The number of plays remaining need not be displayed as a numeric count per se, but may appear visually as a graphic representation. In a typical game to be played on the gaming system, between 1200 and 4800 plays are included in each fixed pool of game plays. In an alternate embodiment, however, the gaming system 10 has the ability to handle "lotto" type games including a million plays or more.

In the preferred embodiment, each master processing unit 14 can dispense up to twelve or more games simultaneously, and each slave terminal 16 is continuously informed as to the amount of plays remaining in each fixed pool of plays. As an added feature, if many slave terminals 16 are located in a single gambling hall or casino, each slave terminal 16 will display to the player the various events happening within the hall. Announcements regarding closing of the hall, or that another player has won, enhances the feeling that each player is competing against a group of players and not just against the machine itself.

The video pull-tab lottery games administered by the gaming system 10 preferably have the following characteristics. A video representation of a pull-tab ticket is provided on the slave terminals 16 showing which combinations of symbols comprise a winning play. This video "ticket" comprises one of the fixed pool of plays provided by the central game processor 12 for each pull-tab game. The gaming system 10 also displays the video ticket both before and after it has been opened. Such display illustrates the appropriate graphic symbols that indicate either a winning or losing play. A mechanism that allows each player to manage his betting while the game is being played is also provided. Features of this mechanism include facilities for crediting, debiting, depositing and withdrawing wagers as required by each player during play of the game.

As mentioned, software is employed throughout the gaming system 10 in order to provide the fixed pools of game plays and to coordinate the activities taking place in the gaming system 10. The central game processor 12 includes a program for generating the fixed pools of game plays for each game supplied in the gaming system 10. As provided in the paper pull-tab lottery games, each fixed pool of game plays includes a predetermined number of winning plays. This predetermined number of winning plays is fixed at the generation of each pool of game plays. As a result, in a fixed pool of "x" game plays and "y" winning plays, there are $x-y="z"$ game plays that do not constitute a winning hand. Software provided on the slave terminals 16 continuously indicates to each player the number of winning plays already purchased from each fixed pool and thus provides an indication of the chances of purchasing a subsequent winning play.

Software is also provided to configure and operate the components of the gaming system 10 to perform their intended functions. The specific functions performed by each of the components of the gaming system 10 is described in more detail below. A preferred listing of the object code for the software employed with the gaming system 10 is provided in the microfiche appendix.

I. Central Game Processor 12

Figure 2:
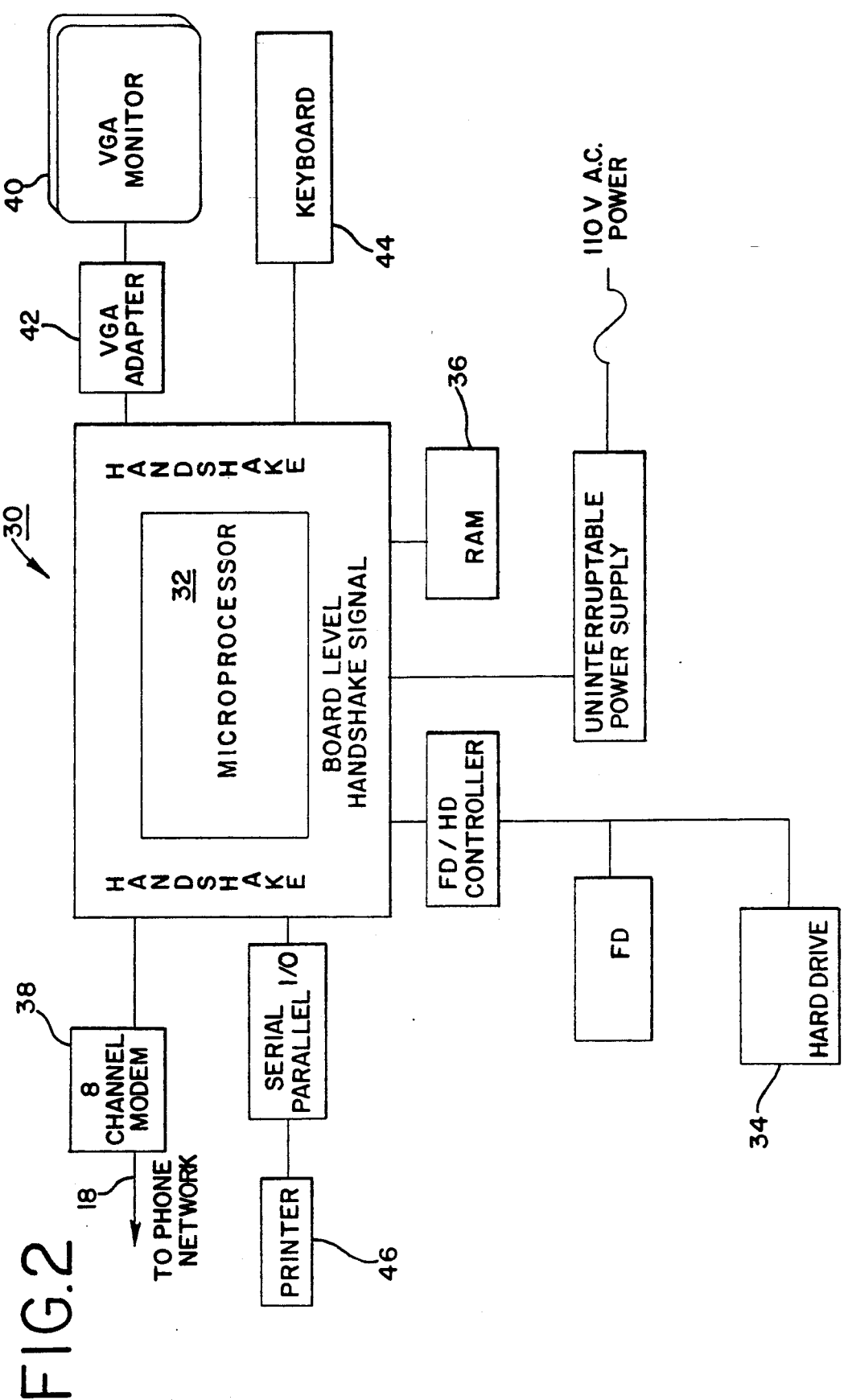
FIG. 2 is a block diagram of one preferred central game processor employed in the gaming system shown in FIG. 1.

Referring to FIG. 2, the central game processor 12 comprises a central computer 30. In the preferred embodiment, the central computer 30 can be an IBM Personal Computer-AT (or the equivalent), including an 80386 (or 80486) microprocessor 32 manufactured by Intel Corp., Santa Clara, Calif., which preferably operates at a thirty-three megahertz clock speed. Further provided on the central computer 30 is a hard disk drive 34 and random access memory (RAM) 36. In order to provide ample storage space for the software running on the central game processor 12, preferred sizes for these memory devices range from 80- to 100-megabytes for the hard disk-drive 34 and four megabytes for the RAM 36.

To facilitate communication with the master processing units 14, the central computer 30 also includes a plurality of modems 24, or a multi-channel communication card (not shown). To achieve the necessary data throughput, the modem 24 preferably operates at 2400-baud or higher. To complete the architecture of the central game processor 12, the central computer 30 also includes a video monitor 40 and an associated video graphics adapter (VGA) card 42, a keyboard 44, and a printer 46.

The central game processor 12 operates as the central or coordinating computer for the overall gaming system 10. One function of the central game processor 12 is to issue new fixed pools of game plays and new games to each master processing unit 14 as they are needed. The central game processor 12 thus keeps an adequate inventory of the games currently being offered, and ensures that the system itself is operating properly. A prime function of the central game processor 12, therefore, is to communicate with each master processing unit 14 and to supply each master processing unit 14 with more pools or more games.

In the preferred embodiment of the invention, new pools of game plays are entered by operators at the central game processor 12. Operators simply key in data from preexisting paper pull-tab lottery tickets into the central computer 30. As will be described in more detail below, software running on the central computer 30 converts the raw symbol and deal data entered by the operators into several files to be used in the gaming system 10. For example, one of such software programs examines the data entered for each paper ticket and searches for winning symbol combinations. Winning combinations are identified by the central computer 30, which stores temporarily the amount won for that combination. When all combinations and directions (horizontally, vertically and diagonally) have been scanned and scored, the final amount won is appended to the ticket data (described in detail below) and stored in the central computer 30. As is the case with most tickets, if no winning combinations are detected, the amount won will be zero and stored as such with the ticket data. When all tickets have been entered and scanned by the central computer 30, the pool of tickets is stored for subsequent transfer upon request from the master processing units 14.

In order to perform its tasks, the central game processor 12 should preferably receive and log update requests from each master processing unit 14. Conversely, the central game processor 12 is able to poll each master processing unit 14 to request status about the specific local area network 20 configuration and the individual status of each slave terminal 16 connected thereto. The central game processor 12 thus becomes both the logical and physical link between all of the master processing units 14. A detailed description of the communication protocol between the master game processors 14 and the respective slave terminals 16 is provided below in connection with FIG. 18.

In the preferred embodiment of the invention, the central game processor 12 comprises a personal computer or minicomputer. The functions described above, as well as additional functions, are thus contained in software programs that execute on the central game processor 12. For example, such software enables the central game processor 12 to transmit codes in order to communicate with each master processing unit 14. These codes communicate instructions to the master processing units 14 to cause information stored in the master processing unit 14 to be transmitted to the central game processor 12. The software also enables the transmission of new game designs from the central game processor 12 to each master processing unit 14. Further, software is provided to poll each master processing unit 14 in order to determine gaming patterns and trends.

Figure 3:
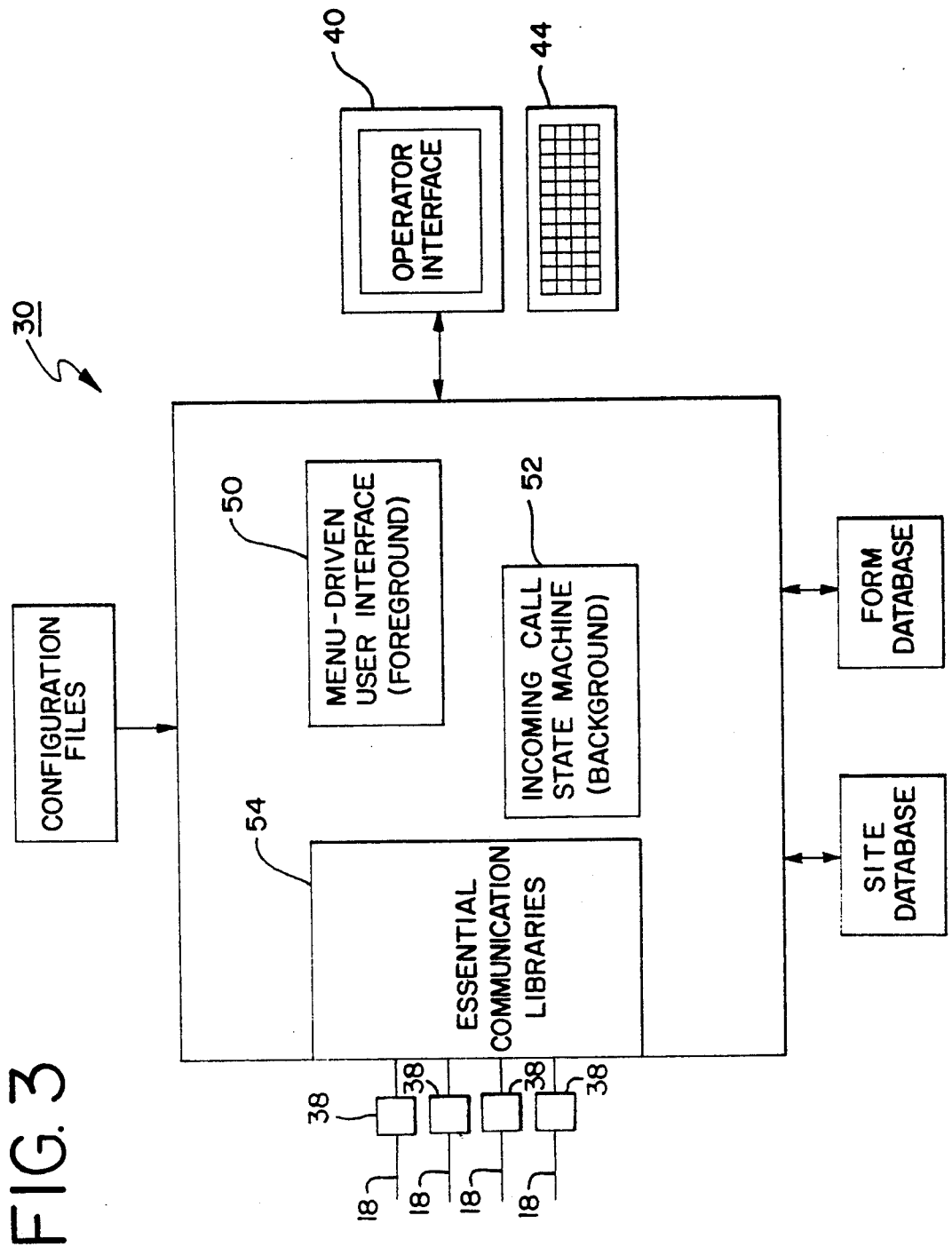
FIG. 3 is a graphical depiction of the software architecture employed in the central game processor shown in FIG. 2.
Figure 4:
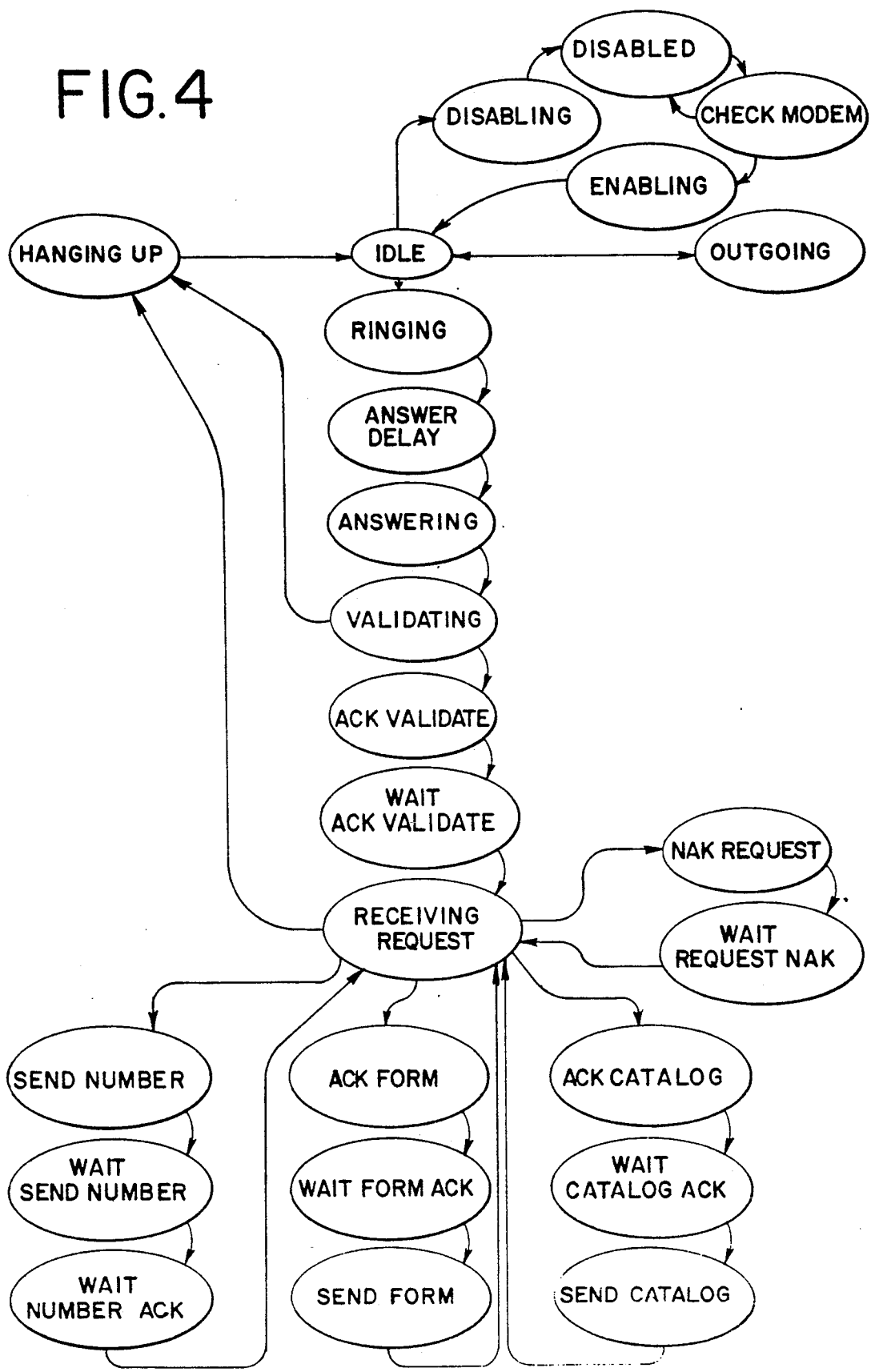
FIG. 4 is a state diagram for an incoming call state machine employed in the central game processor shown in FIG. 3.

A graphical depiction of the software architecture for the central game processor 12 is shown in FIG. 3. Both foreground 50 and background 52 tasks are performed by the software operating on the central computer 30. Foreground tasks 50 handle a menu-driven operator interface, which receives input from the system administrator sitting at the video monitor 40 and keyboard 44. Executing in the background is a routine for handling incoming calls from the master processing units 14. Each call comes into the central computer 30 over a series of telephone lines 18 and is received by the plurality of modems 24 included in the central game processor 12. After the incoming call is processed by the communications software 54, the central game processor 12 must determine how to respond to the call. Provided in FIG. 4 is a state machine included in the central computer 30 that handles the incoming calls.

II. Master Processing Unit 14

Figure 5:
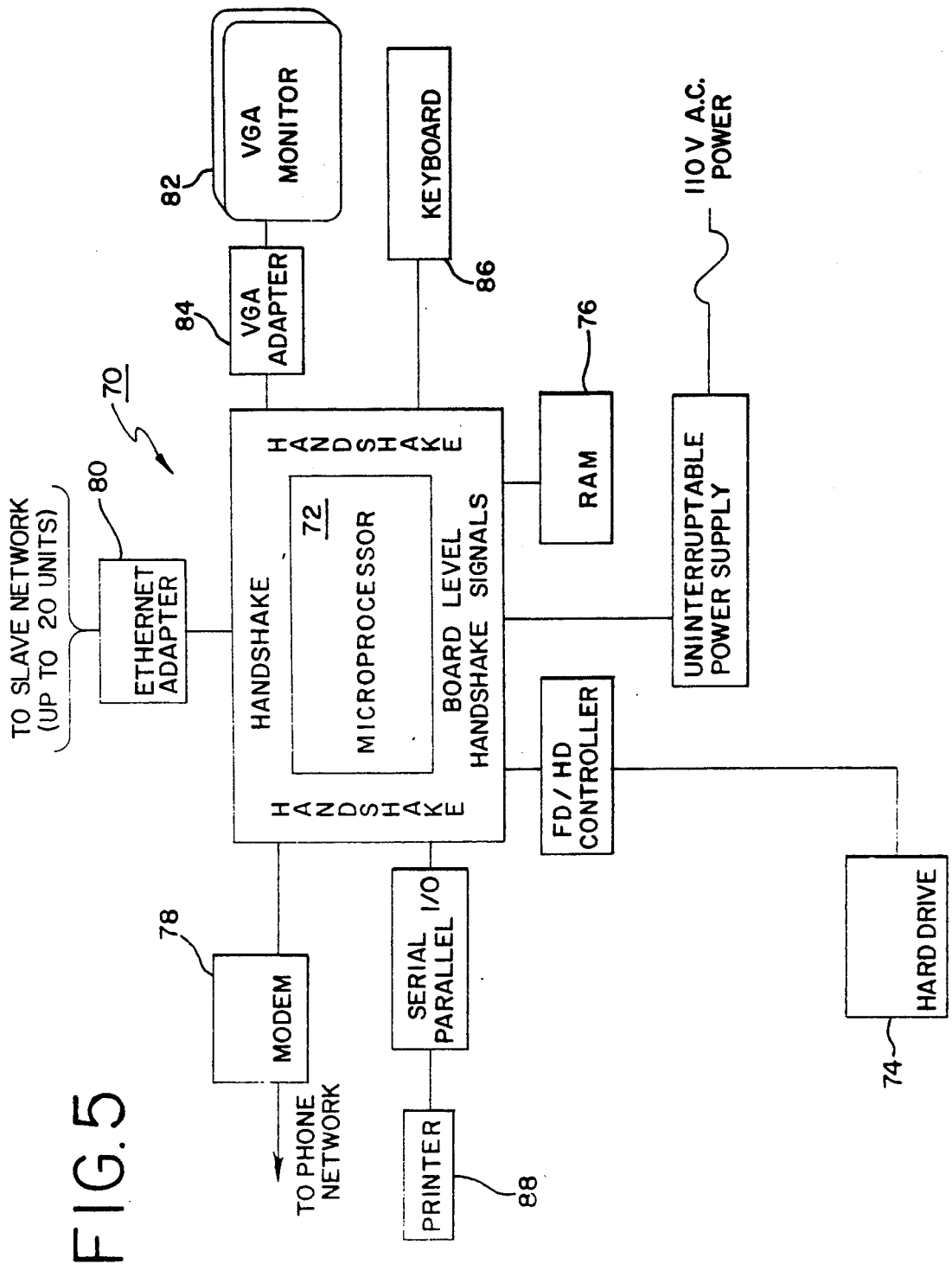
FIG. 5 is a block diagram of one preferred master processing unit employed in the gaming system shown in FIG. 1.

A preferred embodiment of one master processing unit 14 is shown in FIG. 5. In the preferred embodiment shown in FIG. 5, each master processing unit 14 includes a master computer 70. The master computer 70 is preferably an IBM Personal Computer AT-type computer, including an 80386 microprocessor 72 manufactured by Intel Corp., Santa Clara, Calif., and operated at a clock speed of thirty-three megahertz. The master computer 70 also includes a hard disk memory 74 and on-board RAM 76. To satisfy the software needs of the master processing units 14, the hard disk memory 74 should be at least 80-megabytes and the on-board RAM 76 should include between two and four megabytes of addressable space.

Further provided on the master computer 70 is a 2400- to 9600-baud modem 22 for communication with the central game processor 12, and a LAN interface 80 for communication with the plurality of slave terminals 16 coupled to the master processing units 14. The LAN interface 80 on the master processing unit 14 is thus similar to that provided in each slave terminal 16 (described below). A video monitor 82 and associated video graphics adapter card 84 are also included in the master computer 70, as is a keyboard 86. The master computer 70 may also include an optional printer 88.

Each master processing unit 14 has two primary responsibilities: (1) to perform certain requests initiated from the central game processor 12, and (2) to maintain continuous communication with each slave terminal 16. As part of its first task, each master processing unit 14 responds to requests initiated by the central game processor 12. In the preferred embodiment, each master processing unit 14 stores at least one fixed pool of game plays received from the central game processor 12. Each master processing unit 14 further includes passwords for four levels of access to the master processing units 14. These passwords are distributed to the various levels of master administrators operating each master processing unit 14. One password is preferably employed to start the game, and at least one other password is required to change or display any network parameters.

As part of its second responsibility, each master processing unit 14 is prepared to respond to requests from the slave terminals 16 configured on its local area network 20 (FIG. 1). A primary function of the master processing units 14 is to download game plays requested from the slave terminals 16 from the fixed pool of game plays stored in the master processing unit 14. Each master processing unit 14 can also request the status of each slave terminal 16, generate and send a validation code to any slave terminal 16, and broadcast messages to all slave terminals 16 connected to its local area network 20.

The master processing unit 14 also has the ability to view network activity in order to determine the status of a particular game being played at the various slave terminals 16. In a preferred embodiment, the master processing unit 14 displays to a master administrator (bingo hall or gambling operator) an inventory report of the games currently offered on the gaming system 10. The master processing unit 14 also displays the status of its network, i.e., the status of each slave terminal 16 connected to the master processing unit 14, and provides an audit report regarding each particular slave terminal 16. The master processing unit 14 also displays the status of each pool, which includes an indication of the amount of plays remaining. A list is also provided of game options, which are selectable at each master processing unit 14 by the master administrator.

As play on the gaming system 10 commences, the main duty of the master processing unit 14 is to poll the slave terminals 16, one-by-one, to provide their status. The collection of status information is done such that each player will not notice a delay in response time from his or her slave terminal 16. The status of each slave terminal 16 may be one of five states: (1) enabled, (2) disabled, (3) out of service, (4) not responding, and (5) operational.

Each master processing unit 14 also includes facilities to shut down its local area network 20 in an orderly fashion, and then power down its branch of the gaming system 10. Thus, each master processing unit 14 of the gaming system 10 configures its local area network 20 on a case-by-case basis.

Figure 6:
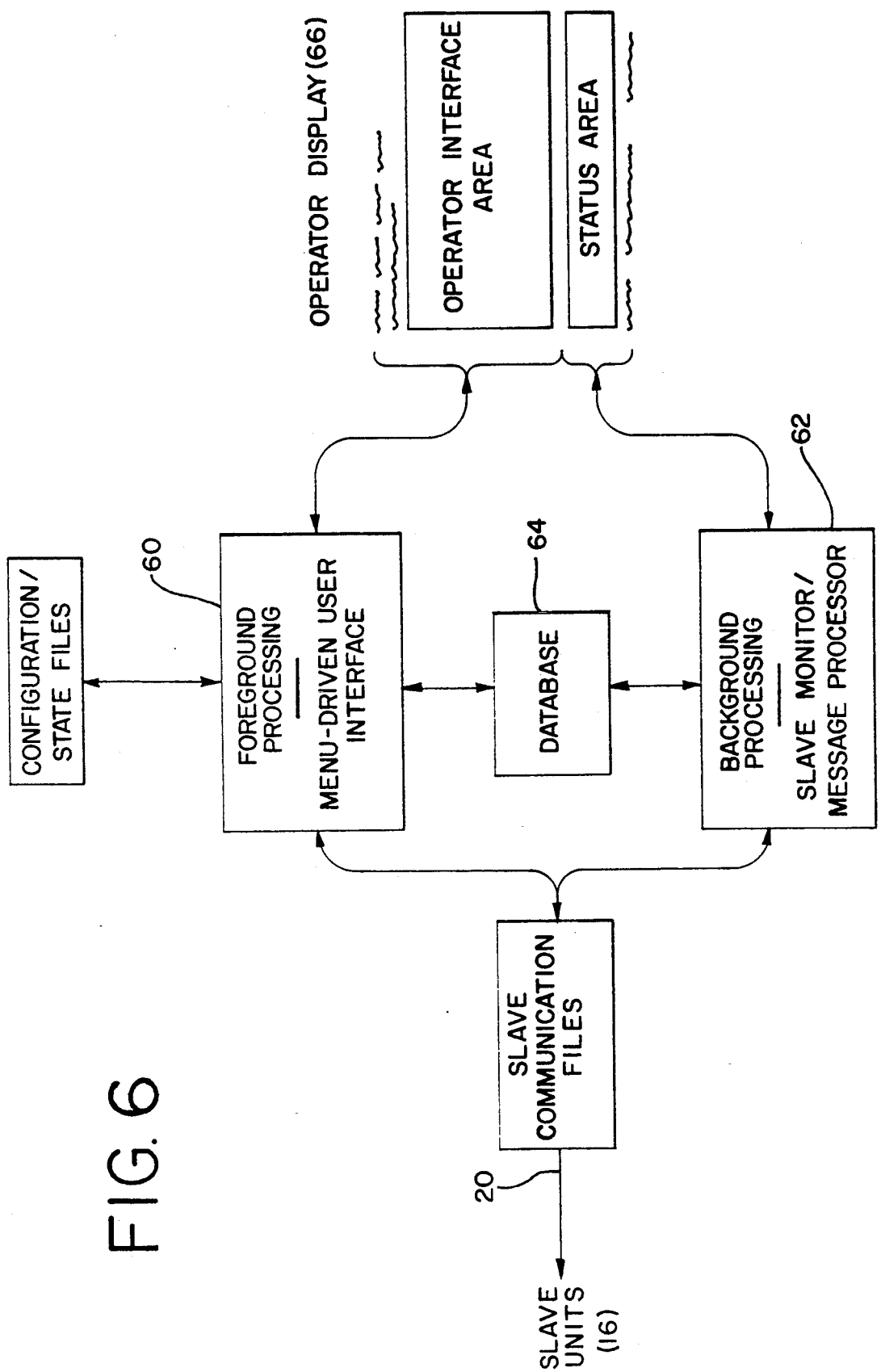
FIG. 6 is a graphical depiction of the software architecture employed in one preferred embodiment of a master processing unit shown in FIG. 5.

A graphical depiction of the software architecture for the master processing units 14 is provided in FIG. 6. Each master processing unit 14 preferably performs internal diagnostics upon power-up. After the diagnostics are completed, a password or log-on code is required from the master administrator to start the games, as described above. After the proper log-on has been initiated, the display appearing at each master processing unit 14 continuously shows the status of each slave terminal 16 connected to its local area network 20.

As shown in FIG. 6, foreground 60 and back ground 62 processing is performed at the master processing units 14. In the foreground, a menu-driven user interface is provided to handle communication to and from the master administrator. Information received from the master administrator is communicated from an operator display 66 and handled by the foreground processing routines.

Background processing 62 on the master processing unit 14 handles messages received from the slave terminals 16. Information from the slave terminals 16 is received by the master processing unit 14 over its local area network 20. Similarly, game plays from the fixed pool of game plays stored in a database 64 located on the master processing unit 14 are communicated over the local area network 20 to the slave terminals 16. A flow chart of the background processing 62 performed on the master processing unit 14 appears in FIG. 7.

Figure 7:
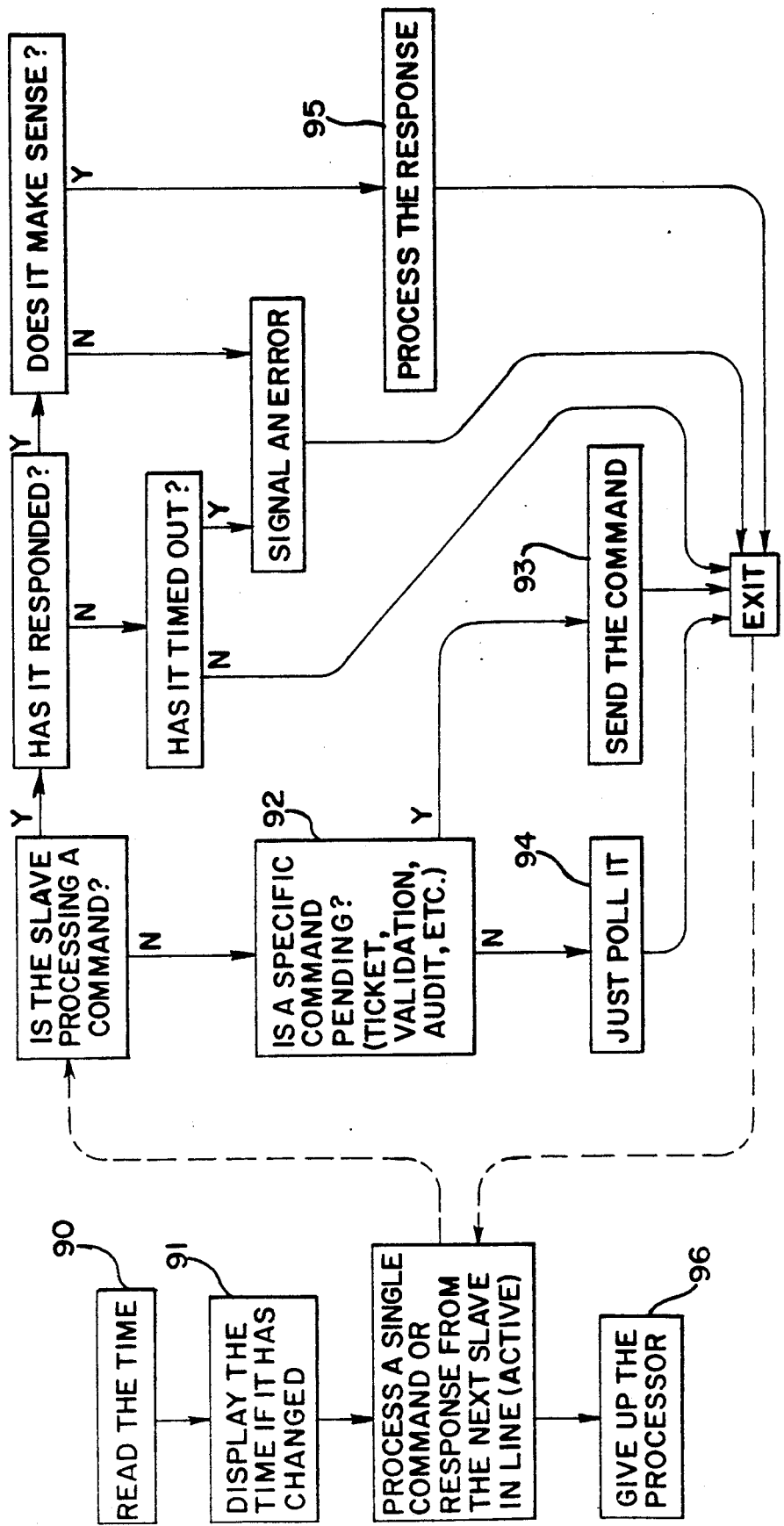
FIG. 7 is a flow chart of a preferred background processing routine shown in FIG. 6.

As shown in FIG. 7, at steps 90, 91, the background loop normally reads and displays the time of day until a command (ticket validation, audit, etc.) or response is received from a slave terminal 16. If a command or response has taken place, the master processing unit 14 must determine how to react. As shown at steps 92, 93, if a specific command is pending at the master processing unit 14, the command is sent to the requesting slave terminal 16 over the local area network 20. If not, the master processing unit 14 may poll the slave terminal for its status at step 94.

After transmitting a command, the master processing unit 14 determines at steps 97, 98 whether the slave terminal 16 has responded appropriately. If so, the master processing unit 14 processes the response at step 95. After completion of these tasks, the background routine relinquishes control of the master processor at step 96.

In order to access any of the remaining features provided at each master processing unit 14, a second or third password may be required as explained above. Examples of the remaining features provided by the master processing units 14 include selection of game options, record keeping and audit-oriented tasks. A detailed description of these functions is provided in more detail below.

III. Slave Terminal 16

Figure 8:
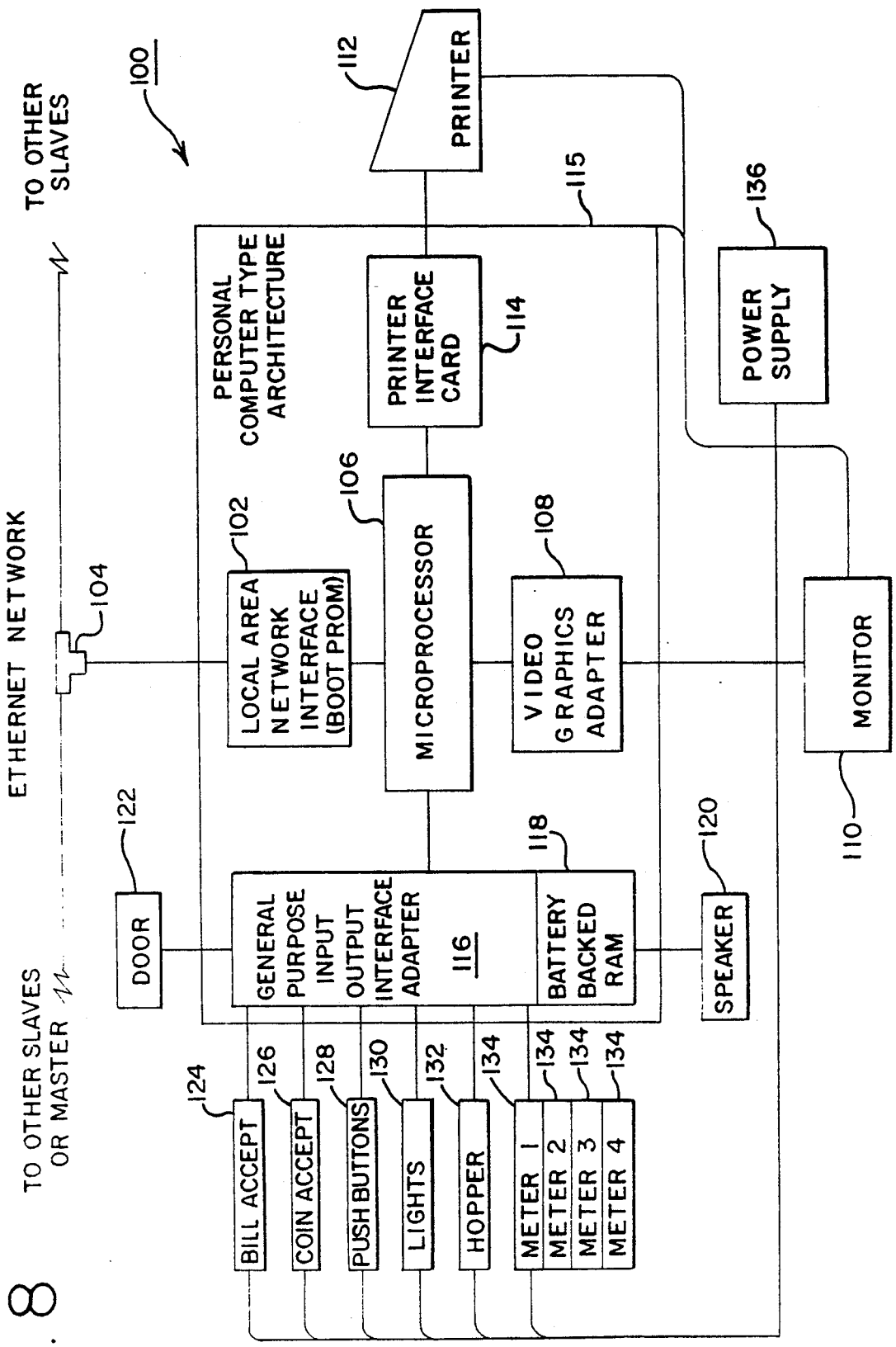
FIG. 8 is a block diagram of one preferred slave terminal employed in the gaming system shown in FIG. 1.

FIG. 8 is a block diagram of one preferred embodiment of a slave terminal 16. At the heart of each slave terminal 16 is a slave computer 100. The slave computer 100 can be in one preferred embodiment an IBM Personal Computer, or a minicomputer or personal computer of similar function. The slave computer 100 thus preferably includes a microprocessor 106 and a video graphics adaptor 108, which connects to a color monitor 110. In the preferred embodiment of the invention, the slave computer microprocessor 106 is an 80286 (or 80386) microprocessor manufactured by Intel Corp., Santa Clara, Calif., which preferably operates at a twenty megahertz clock speed.

Included in the slave computer 100 is a LAN interface 102 for communication to the master processing unit 14. The LAN interface 102 couples to a LAN connector 104 provided on the slave terminal 16, which ties each slave terminal 16 to its respective local area network 20 (FIG. 1). The LAN connector 104 preferably comprises a BNC T-type connector for configuration to the local area network 20. In the slave computer 100, the LAN interface 102 uses interrupts "IRQ3" or "IRQ15" to communicate with the microprocessor 106, and preferably is ROM-base selectable. A programmable read only memory (PROM) used to boot start the slave terminal 16 is also included in the LAN interface 102.

The color monitor 110 included in each slave terminal 16 is an essential element to the player interface of the gaming system 10. In the preferred embodiment, each color monitor 110 displays the video version of the paper pull-tab lottery ticket that comprises a preferred game play in the gaming system 10. Preferably, the color monitor 110 produces a 640×480×256 non-interlaced display. The smaller the dot pitch of the color monitor 110, the more accurate the display; however, extremely high graphics resolution is not a critical item of the slave terminal 16. The video graphics adaptor 108 consequently provides the same 640×480×256 non-interlaced display, and is preferably capable of displaying up to 256 colors simultaneously. The video graphics adaptor 108 also includes approximately one megabyte of on-board memory (not shown) to achieve the displays contemplated for use in the preferred gaming system 10. The memory provides storage for video graphics software drivers and other video graphics processing elements.

The Bios type employed in the slave terminals 16 may be any of the commercially available Bios types, so long as a keyboard (not shown) provided on the slave terminal 16 can be disabled through software. The slave computer 100 should also preferably include at least 512-kilobytes of random access memory to accomplish its many tasks in a reasonable time.

As shown in FIG. 8, a general purpose input-output (I/O) interface adapter 116 is also coupled to the microprocessor 106 The general purpose I/O interface adapter 116 preferably resides at memory address D800H. In the preferred embodiment, the general purpose I/O interface adapter 116 comprises a custom printed circuit board, which is described in greater detail below in connection with FIGS. 10-13. The general purpose I/O interface adapter 116 connects to a speaker 120 located on the exterior of the slave terminal cabinet 115. The speaker 120 projects the various sounds used during the play of the games on the gaming system 10. These sounds are stored and generated by a sound generator chip located in the general purpose I/O interface adapter 116 (described below). Connected to the general purpose I/O interface adaptor 116 is a battery backed RAM 118. A door 122 is also provided in the slave computer cabinet 115 to allow operator or service access to the general purpose I/O interface adaptor 116.

Configured to the general purpose I/O interface adaptor 116 are the necessary electro-mechanical devices required to implement the gaming system 10 of the invention. In the preferred embodiment, these elements include a wager accepter, preferably in the form of a bill accepter 124 and a coin acceptor 126, a plurality of player-controlled selection devices in the form of pushbuttons 128, and indicator lights 130. The front switch panel of the slave terminal 16 may include as many as ten such player controlled pushbuttons 128. The bill acceptor 124 located on the slave terminal 16 is preferably capable of accepting denominations from $1 to $20. Also provided in the slave terminal 16, are five 16-bit expansion slots (not shown) for future expansion or customization, a hopper 132 to retain wagers and at least four digital meters 134 to display scores, etc.

Each slave terminal 16 also preferably provides a validation ticket to the players after the player is through playing. The slave computer 100 also includes a printer 112 to provide a hard copy printout of its status. The interface between the microprocessor 106 and the printer 112 is accomplished through a printer interface card 114 as shown in FIG. 8.

Referring to FIGS. 9A-9I, a flow chart of the functions performed by the slave terminal 16 is provided. The functions identified in FIGS. 9A-9I are preferably implemented through software residing at the slave terminals 16. At steps 210, 212 of FIG. 9A execution begins and all variables are initialized. At step 214 the pro gram checks for a power failure, and if power has failed, at step 216 corrective action is taken and flow proceeds at step 218 to pick up where execution left off (see FIG. 9B below). At step 224 the program determines if player credits are available from either wager deposits or a player's winnings. If there are no credits available, then the particular slave terminal 16 is not being used and the slave terminal 16 is idle. While not in use, the slave terminal 16 executes a demonstration loop at steps 220, 222 and displays an "attract" screen (discussed below). At step 222 the program checks for any communication sent from the master processing unit 14.

If credits are available at step 224, the program proceeds with play of the game. At step 226, a "select value" screen is displayed and at step 228 the program waits for player entry. While waiting, the program again checks at step 230 for communications from the master processing unit 14. Player entry can come in the form of any of the player controlled pushbuttons 128 provided on the slave terminal cabinet 115 (FIG. 8). A preferred set of pushbuttons 128 is illustrated in FIG. 9A, which correspond to wager denomination pushbuttons 234, 236, 238 (Group 1) or play action buttons 242-250 (Group 2).

Figures 9A, 9B:
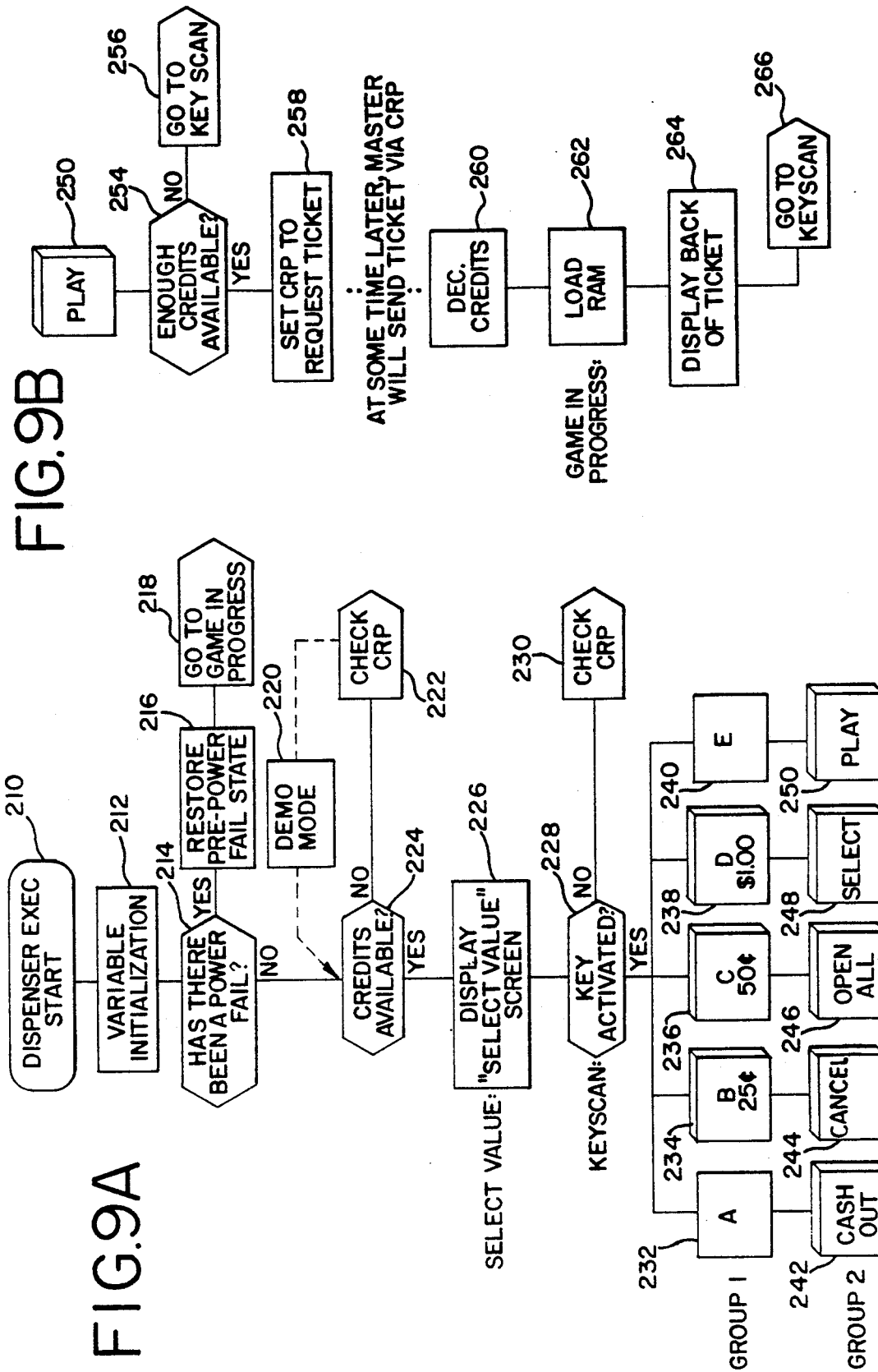
FIG. 9A illustrates main execution flow on the slave terminal.
FIG. 9B illustrates flow of the play selection subroutine.

Referring now to FIG. 9B, should a player depress the Play push-button, the program first determines whether enough player credits are available at step 254. If not, the program branches back at step 256 to wait for correct player input. If enough credits are available to the player, at step 258 the program initiates a ticket request to the master processing unit 14. Upon receipt of the ticket data from the master processing unit 14, the player's credits are decremented to reflect the wager amount at step 260 and the data received from the master processing unit 14 is loaded into the RAM 118 on the slave terminal 16 (FIG. 8). At step 264, the program displays an unopened video ticket and waits for new player input at step 266.

Figure 9C:
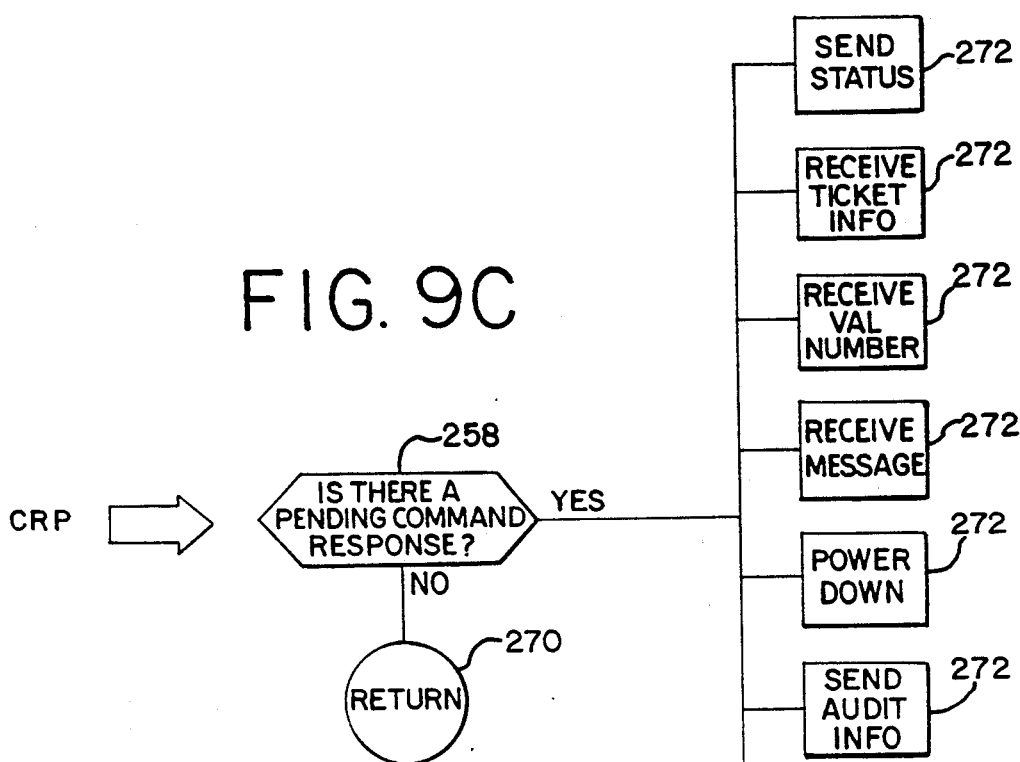
FIG. 9C illustrates flow of the command response subroutine.

FIG. 9C illustrates the flow of communication between the slave terminals 16 and the master processing unit 14. As mentioned above, the slave terminal periodically checks to determine if there is a command pending from the master processing unit (step 268). If not, program flow returns to the main slave routine at step 270. If a command is pending from the master processing unit 14, a response is required by the slave terminal 16. In the preferred embodiment of the invention shown in FIG. 9C, a variety of slave terminal responses 272 are available for the various commands sent by the master processing units 14 (described below).

Figure 9D:
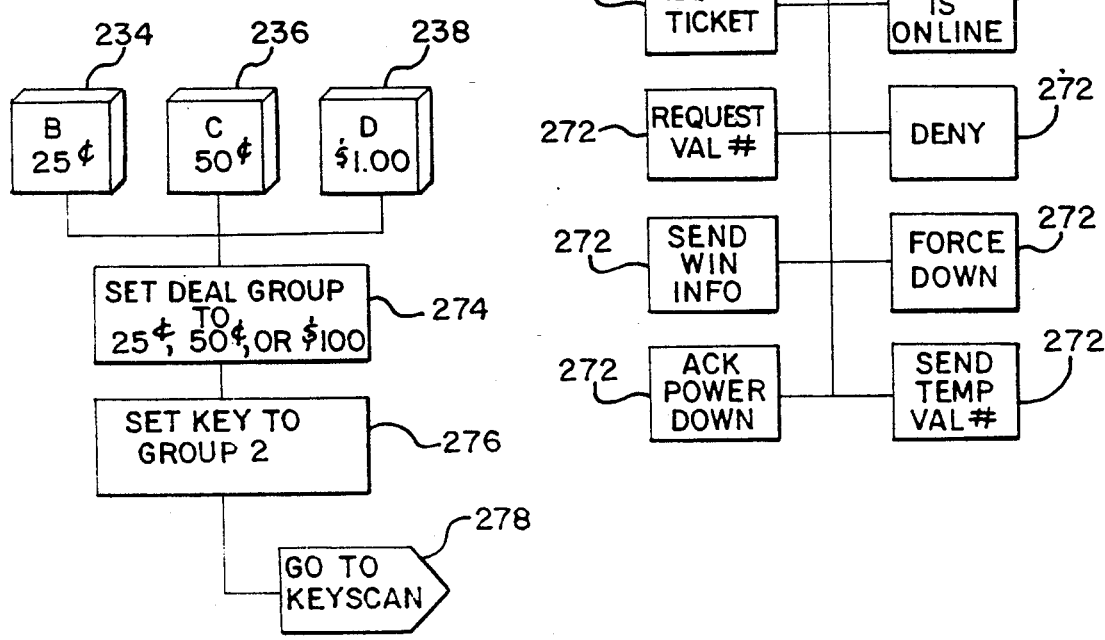
FIG. 9D illustrates flow of the wager selection subroutine.
Figure 10A:
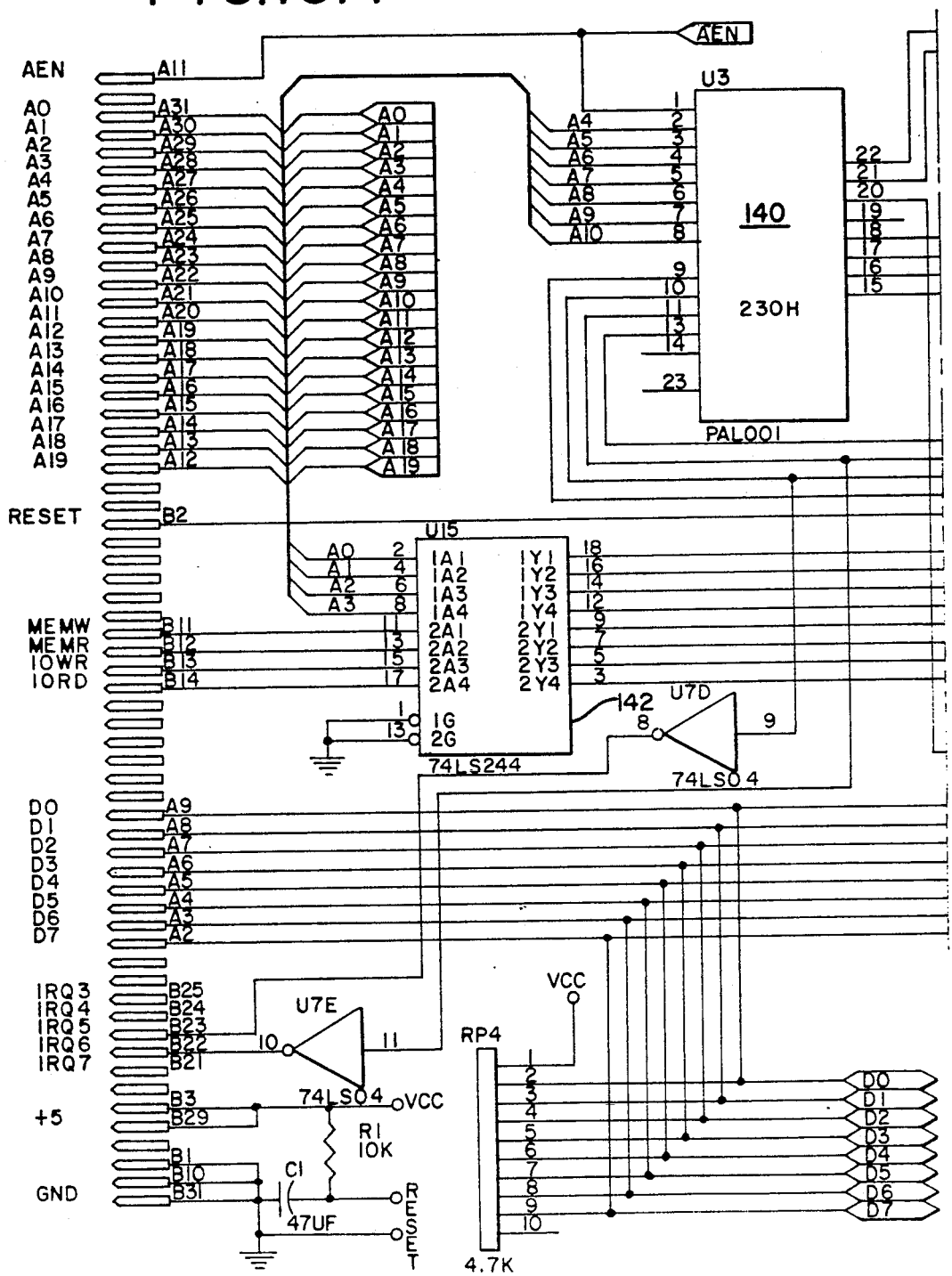
Figure 10B:
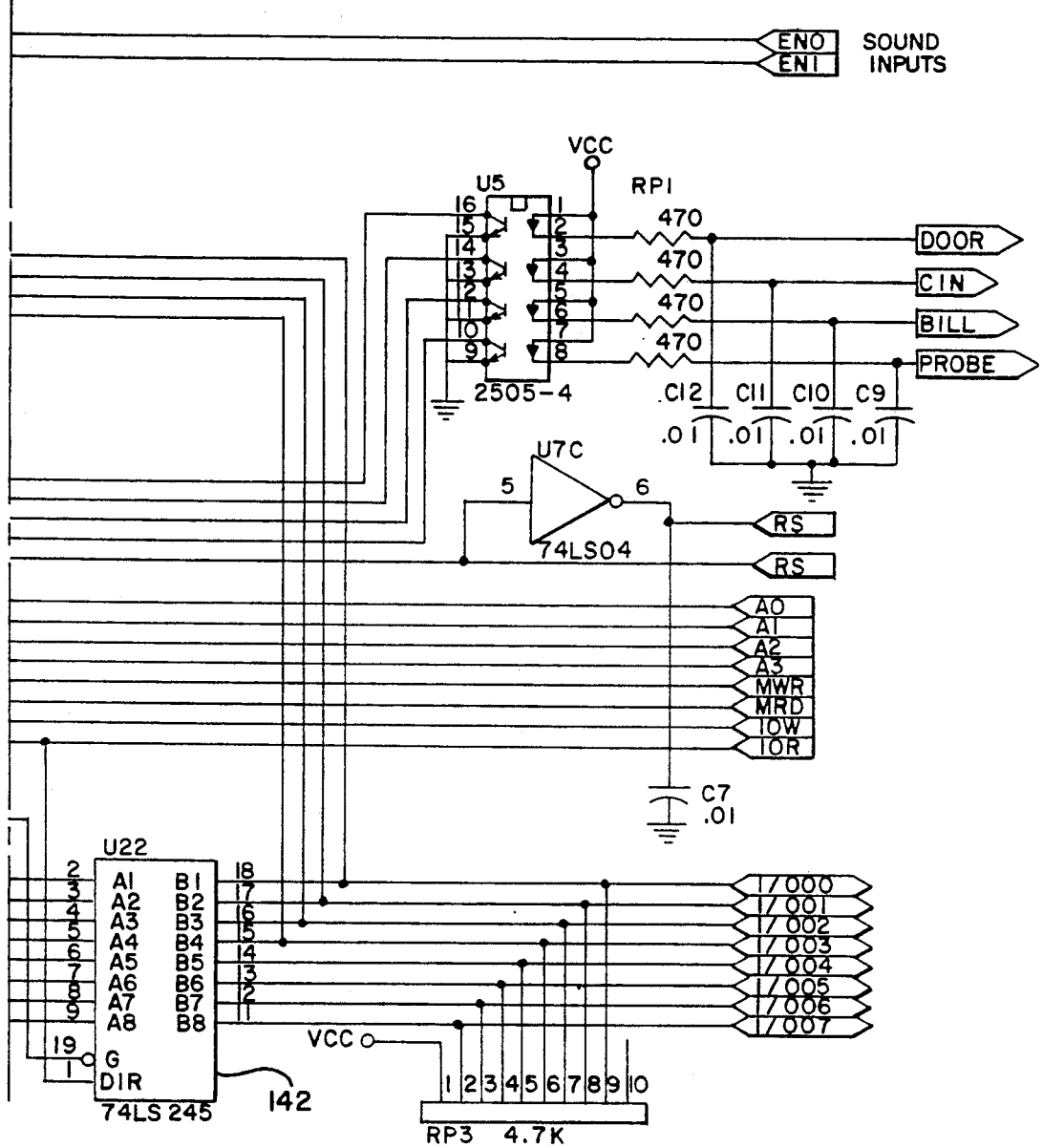

Further player input provided at step 228 of FIG. 9A is illustrated in FIGS. 9D-9H. FIG. 9D illustrates program flow upon selection of one of the wager denomination (Group 1) pushbuttons 234, 236, 238. At step 274 the wagered amount is set, and at steps 276, 278 the program awaits selection of one of the play action (Group 2) pushbuttons 242-250. Should the player select the Cash Out push-button, the program then determines if the player has any credits to redeem (step 278). If not, at step 280 the program returns to wait for valid input. If credits are available to be redeemed, at step 282 the program requests a validation number from the master processing unit 14. Upon receipt of the validation number, at step 284 a validation ticket is printed and at step 286 the player's credits are cleared. The program then returns to the demonstration mode at step 288.

Referring to FIG. 9F, the player may select the Cancel pushbutton. If so, and if a ticket face is being displayed at step 290, the program branches to again display the "select value" screen at step 292. If not, at step 294 the program returns to the main program flow.

Should the player select the Open Tab X or Open All pushbutton, program flow continues at step 246 shown in FIG. 9G. At step 296 the appropriate tab or tabs are opened and the "underlying" ticket symbols are displayed. The program then determines if all tabs are open at step 298. If not, at step 230 the program branches back for more player input (i.e., open the next tab). If all tabs are open, the player credits are incremented at step 302 if a winning ticket was selected. If a winning ticket has been purchased, at step 304 a congratulatory display is also presented. The program then returns at step 306 to await new player input.

Should the player depress the Select pushbutton, at step 308 of FIG. 9H the program displays the face of the next available ticket in the fixed pool of game plays. At step 310, the program waits for new player input.

Referring to FIG. 9I, a wager subroutine is illustrated. At step 312, an interrupt is generated to the microprocessor 106 (FIG. 8) and at step 314 the player's credits are increased according to the wager amount deposited by the player into the slave terminal 16. At step 316, the program then returns to the main program flow of FIG. 9A.

Referring now to FIGS. 10-13, detailed schematic diagrams of the general purpose I/O interface adapter 116 are provided. As seen in FIGS. 10-13, a plurality of programmable array logic devices (PAL's) 140 are employed throughout the general purpose I/O interface adapter 116. The PAL's 140 comprise much of the interconnect circuitry and help reduce the chip count on this printed circuit board. In one preferred embodiment of the invention, the PAL's 140 are programmed using the TANGO-PLD (Version 1.11) PAL assembler. Copies of the programming equations for the PAL's 140 employed in the general purpose I/O interface adapter 116 are provided in the Appendix.

In addition to the PAL's 140, a plurality of buffers/drivers 142 are provided throughout the circuitry shown in FIGS. 10-13. These buffers/drivers 142 help boost, latch and clock signals as they propagate through the general purpose I/O interface adapter 116. As shown in FIG. 11, a RAM 144 is also provided in the general purpose I/O interface adapter 116. In preferred embodiment, the RAM 144 is 32 kilobytes in size.

Figure 12:
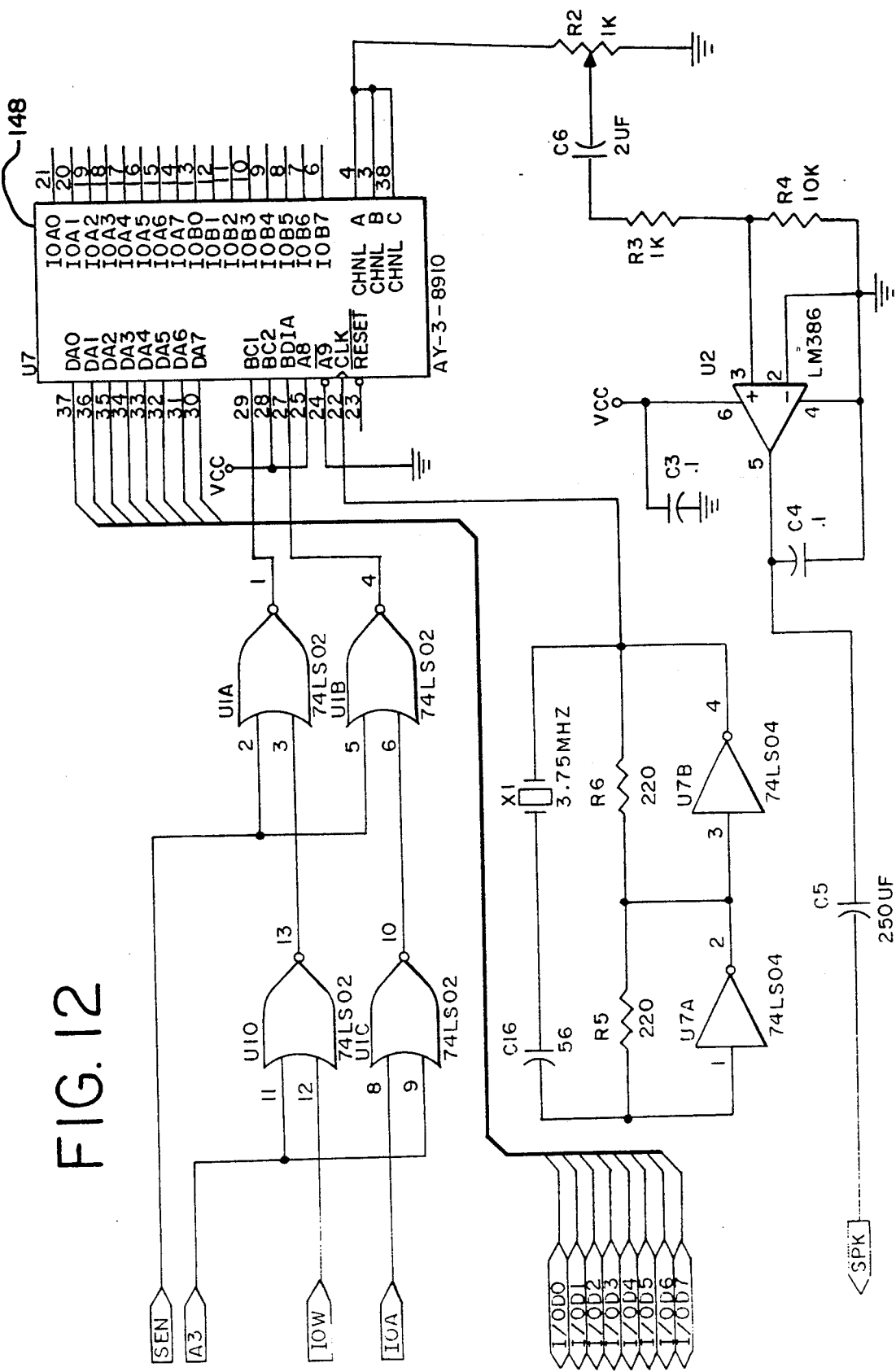

Referring to FIG. 12, a sound generator integrated circuit (IC) 146 is included in the general purpose I/O interface adapter 116. The sound generator IC 146 produces and stores the sounds projected from the speaker 120 (FIG. 8) employed with the gaming system 10. As those skilled in the art will appreciate, such sounds can take on many different forms depending on the games being played on the gaming system 10 and personal tastes.

Figure 13A:
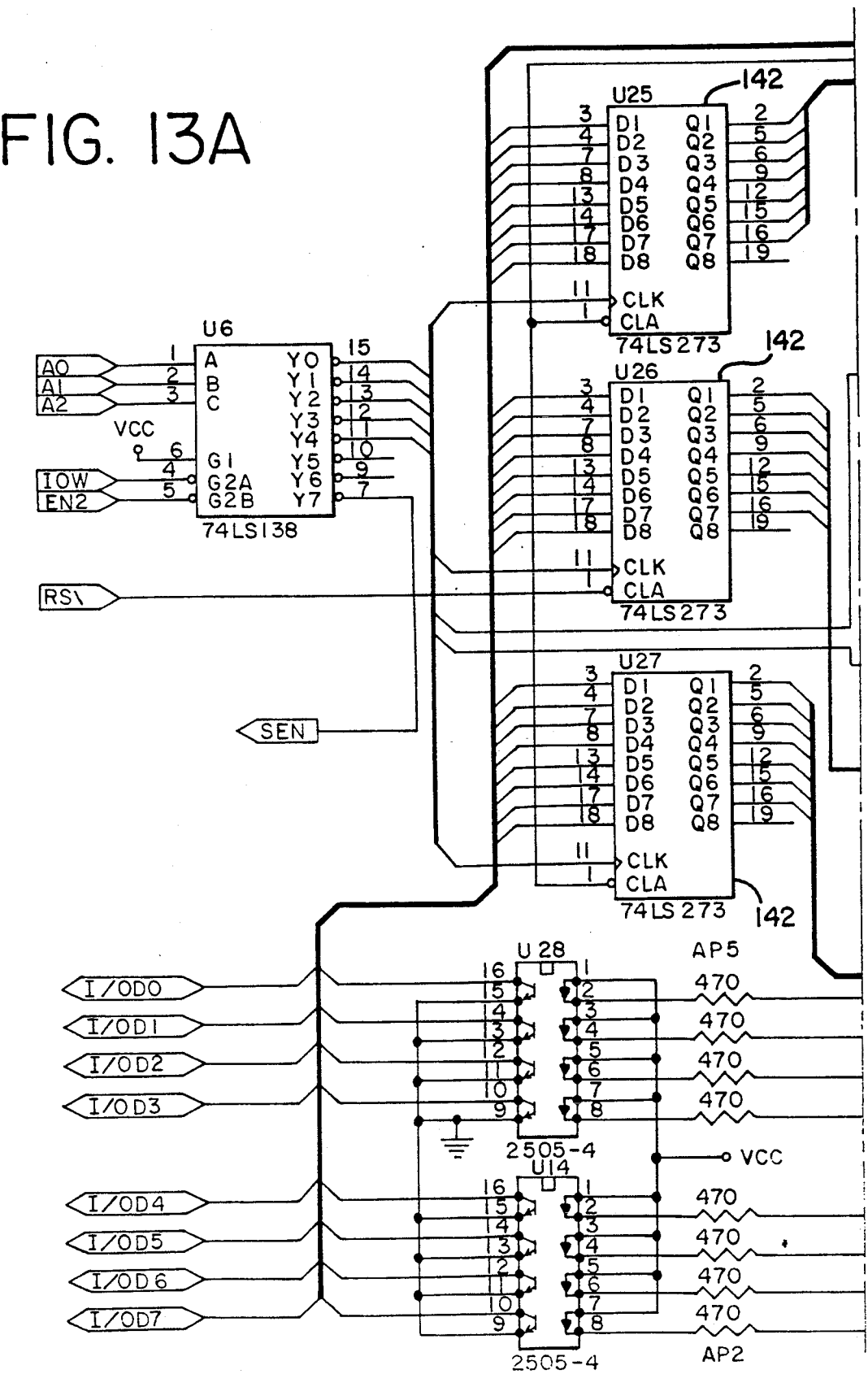
Figure 13B:
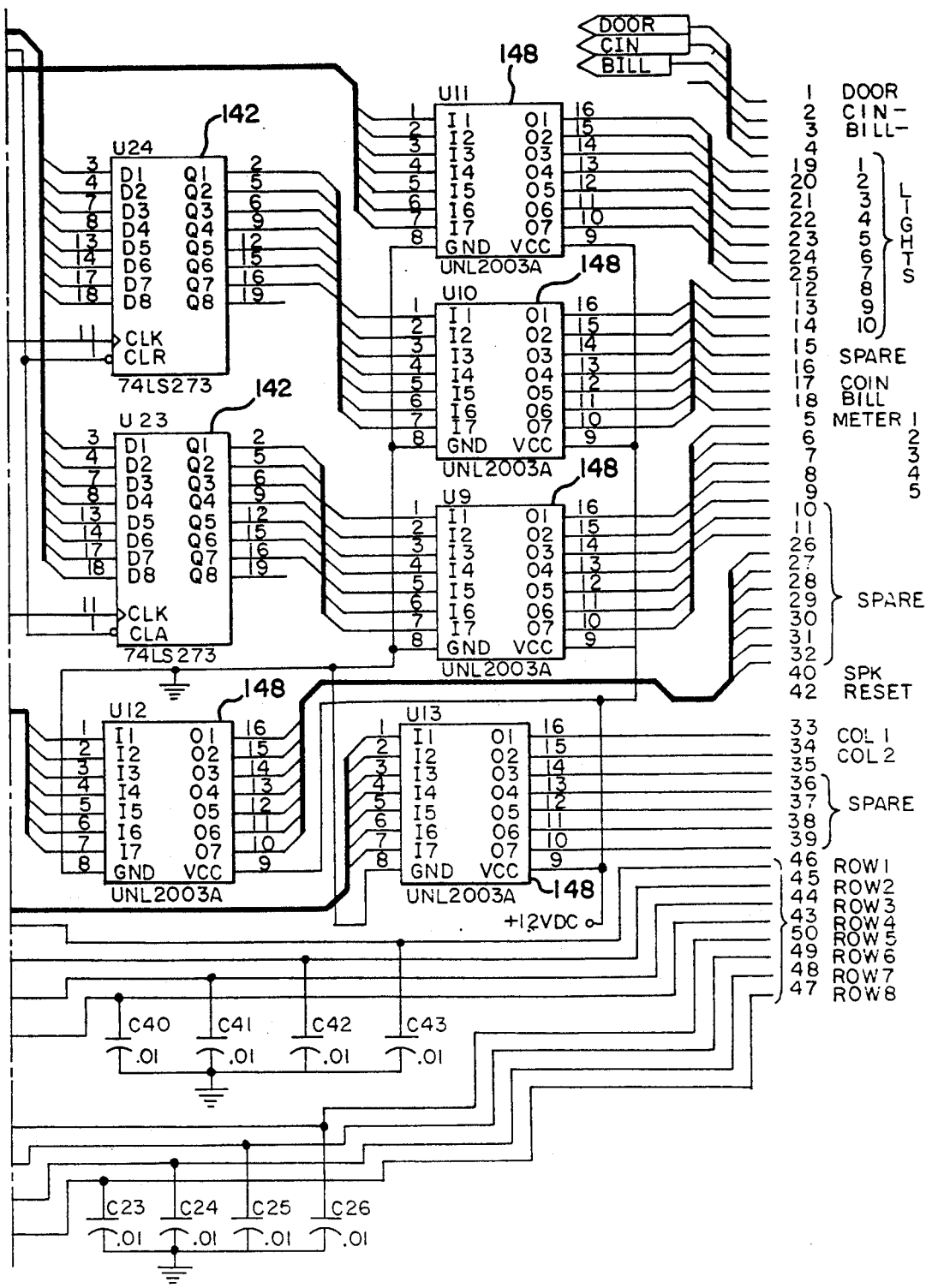

Referring to FIG. 13B, a number of Darlington Drive current boosters 148 are also provided in the general purpose I/O interface adaptor 116. The Darlington current boosters 148 are used in the preferred embodiment to drive the indicator lights 130, the bill accepter 124, coin accepter 126 and the digital meters 134 appearing on the slave terminal 16 (see FIG. 8).

As can be seen, in the preferred embodiment shown in FIGS. 10-13 many integrated circuits are employed to perform various functions in the general purpose I/O interface adapter 116. To meet the preferred response times for the gaming system 10, therefore, these integrated circuits should possess no more than an 80- or 100-nanosecond propagation delay in order to provide a zero-wait state environment for the gaming system 10.

IV. Gaming System 10 Operation

In the gaming system 10, the slave terminal 16 operates as follows. Preferably, the slave terminal 16 first runs a set of internal diagnostics each time it is turned on. (As shown in FIG. 8, each slave computer 100 is connected to its own power supply 136.) Since each master processing unit 14 preferably shows a graphic map of its slave network during operation of the gaming system 10, if a slave terminal 16 does not pass its internal diagnostics, the network map will show that slave terminal 16 as "ENABLED" but "NOT RESPONDING". It is the master administrator's task to determine what to do to resolve the slave terminal 16 error, such as placing a call for service to a local distributor or service representative. When the slave terminal 16 passes its internal diagnostics, the master processing unit 14 will show the slave terminal 16 as "ON-LINE".

The slave terminal 16 next displays an introductory display on the color monitor 110 to attract attention and players. This attract screen includes demonstration graphics of game operation in a manner known in the art. A depiction of a front view of a slave terminal cabinet 115, including a display of the attract screen appearing on the color monitor 110, is shown in FIG. 14.

Preferably located at the top or bottom of the display is a field 160 used to broadcast messages received from the master processing units 14. As described more fully below, one of the tasks of the master processing units 14 is to broadcast to each slave terminal 16 messages regarding the game pool currently being played on that master processing unit 14. These messages are employed to convey information regarding other players' betting to create an atmosphere of competition over the gaming system 10. An example of these messages include: "Another winning play has been purchased on machine 6!!!"; or "Congratulations to the player on machine 2, who just selected a $250 winning play!!!". In a preferred embodiment, these messages are displayed on each slave terminal 16 regardless of whether it is sitting idle or is in the middle of a play.

Figure 14:
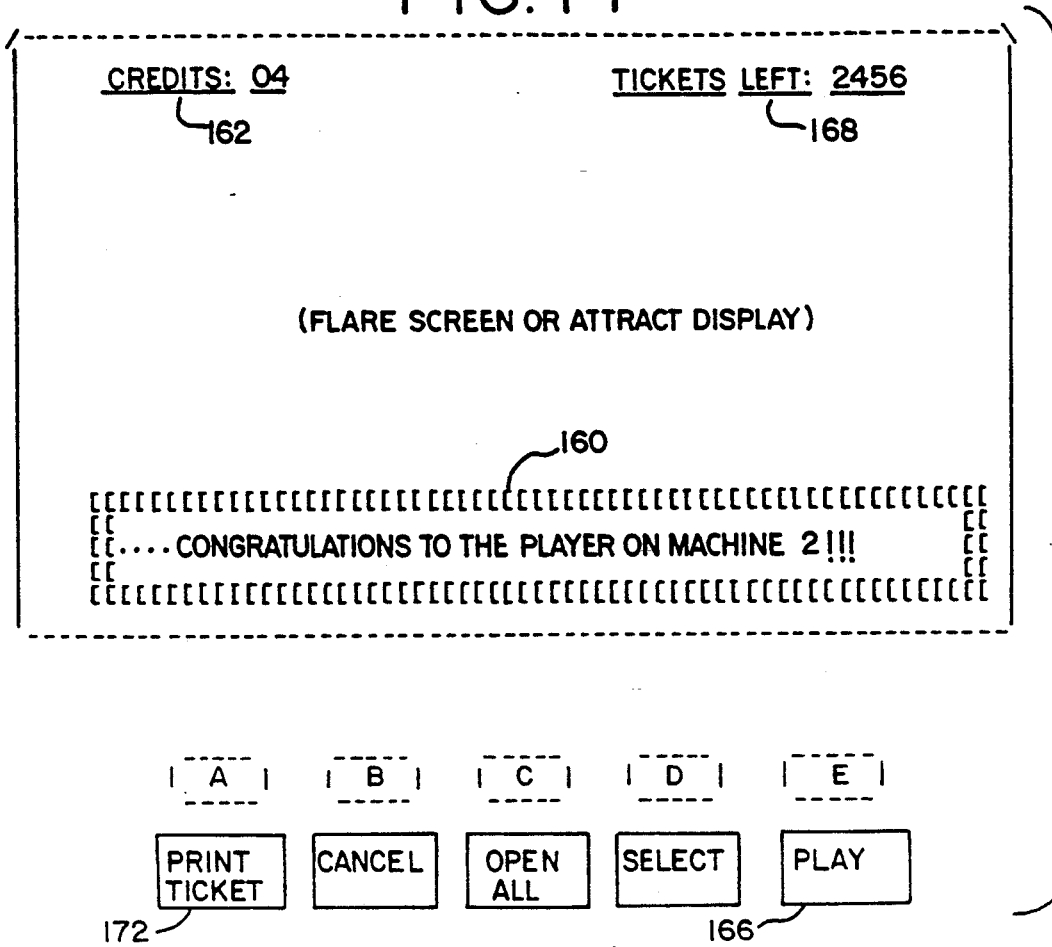
FIG. 14 is a preferred illustration of one display produced on a video monitor employed in the slave terminal shown in FIG. 8.

As shown in FIG. 14, a "CREDITS" field 162 is preferably located in the upper left hand corner of the display appearing on the color monitor 110. An indication of the number of tickets remaining in the pool currently being played is also provided in the upper right hand corner of the display. In the preferred gaming system 10, each time a player deposits a wager in the appropriate slot on the slave terminal 16, the CREDITS field 162 is updated. Deposit of the wager also commences play on the gaming system 10.

Figure 15:
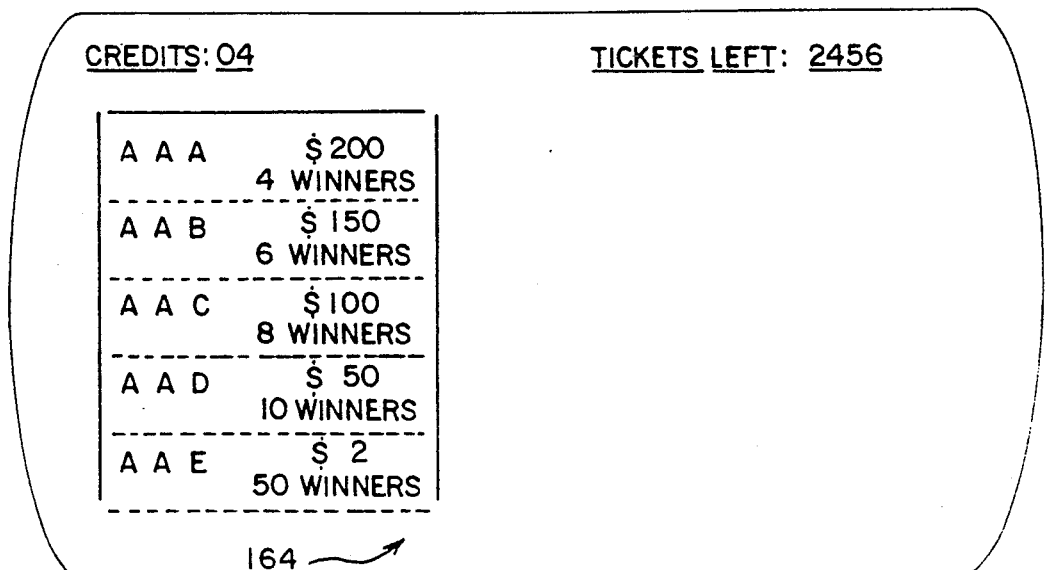
FIG. 15 is subsequent display produced on the video monitor of the slave terminal showing a preferred video lottery ticket.

Referring to FIG. 15, after the placement of a wager the display changes to show the face of a video ticket 164 (corresponding to the face of a paper pull-tab ticket) on the left hand side of the display screen 165. As play progresses, if the player next depresses the Play pushbutton 166 (FIG. 14), the slave terminal 16 will electronically request a play from the pool of remaining plays stored at the master processing unit 14. In response, the master processing unit 14 will transmit to the slave terminal 16 a packet of ticket data representing the purchased play. Each play corresponds to a video pull-tab ticket in the preferred embodiment of the invention. The data received is stored on the slave terminal 16 to be interpreted after the player depresses the next appropriate pushbutton.

In the preferred embodiment of the master processing unit 14 employing the 80286 microprocessor, the worst case response time for the slave terminal 16 to receive a play will be approximately 0.83 seconds. However, the average response time is likely to be 0.42 seconds depending on the number of players currently participating. When the play is received at the slave terminal 16, the CREDITS field 162 is decremented to reflect the wager amount.

Figure 16:
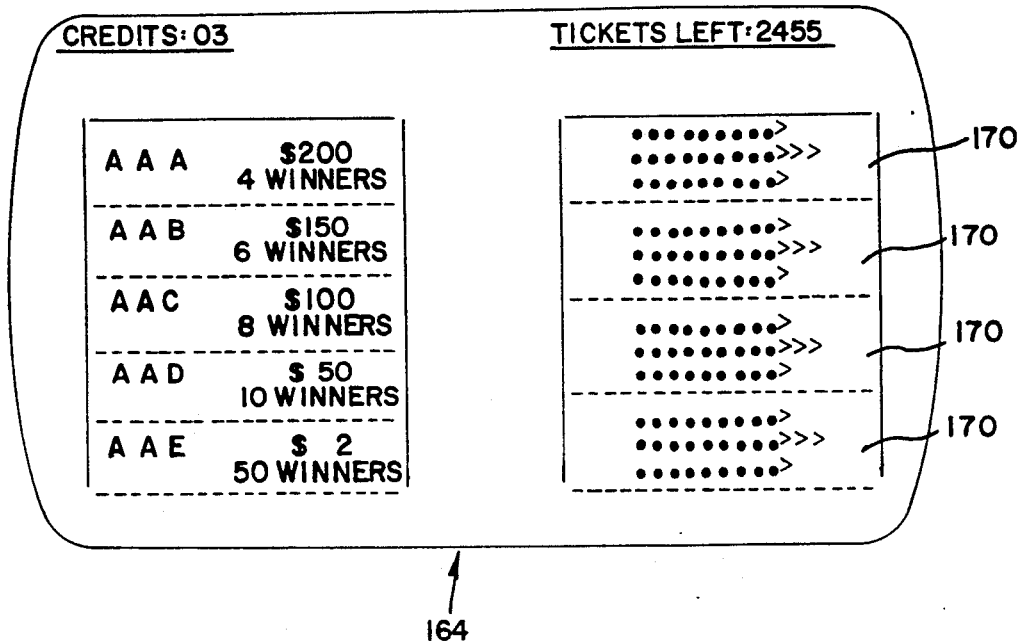
FIG. 16 is further successive display of the video lottery ticket shown in FIG. 15 prior to being opened.
Figure 17:
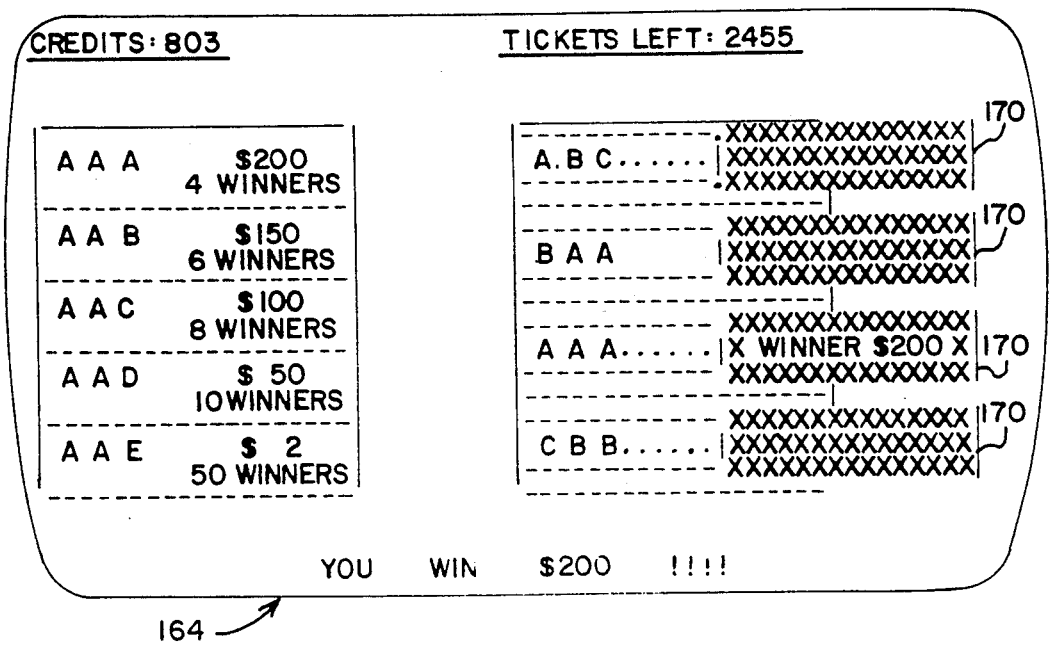
FIG. 17 illustrates the video lottery ticket shown in FIG. 16 after being opened.

The graphic depiction appearing on the screen of the color monitor 110 is then updated to the configuration shown in FIG. 16. The video ticket 164 appearing on the left hand side of the display screen 165 does not change between FIGS. 15 and 16; however, the box appearing on the right side of the display screen 165 is presented to simulate and display the closed pull-tabs 170 of a paper pull-tab lottery ticket. The player then has at a time, or opening all of the pull-tabs 170 at once. In order to further simulate a paper pull-tab lottery ticket, the slave terminal 16 will produce a ripping sound as the screen displays the pull-tabs 170 being slowly opened (FIG. 17). As shown in FIG. 17, the pull-tabs 170 will remain open as if they were peeled away from the video ticket 164 appearing on the display screen 165.

After the pull-tabs 170 have been opened, the slave terminal 16 scans the data received from the master processing unit 14 with each video ticket 164 to determine if the ticket 164 includes any winning combinations. In the preferred embodiment, since all tickets 164 have previously been tabulated and identified by the central game processor 12, the slave terminal 16 simply scans the data received from the master processing unit 14 to detect the presence of a winning combination. Such combination is identified by the central game processor 12 at the time tickets are input into the system (described above) by preferably setting a bit in the video ticket data packet sent to the slave terminal 16. Upon detection of the set bit, the slave terminal knows a winning combination has been purchased. If a winning combination is detected, the slave terminal 16 reads and displays the amount won in the lower portion of the display screen 165 as illustrated in FIG. 17. Any amount won is added to the CREDITS field 162 appearing on the screen. After a short delay, the screen reverts back to the display shown in FIG. 14. This sequence of play, and the associated screen displays, continues until a player exhausts all of his or her credits, or until the player depresses the Cash Out pushbutton 172 (FIG. 14).

After the Cash Out pushbutton 172 has been depressed by a player, a validation ticket is printed with a validation number received from the master processing unit 14. In a preferred embodiment, the player may then take this validation ticket to a cashier in order to redeem any prizes or money won.

V. System Implementation

In a preferred embodiment of the invention, the local area network 20 connecting the slave terminals 16 to the master processing unit 14 is an Ethernet network employing the Ethernet 802.3 protocol. To communicate, each side (i.e., each slave terminal 16 or master processing unit 14) must lock a record transmitted over the network 20 before attempting to read or write it. The recipient must then unlock the record when it is finished. Communication between the slave terminals 16 and the master processing units 14 is thus controlled through software running on each component.

A listing of the definitions of the programs used in a preferred embodiment of the gaming system 10 appears below. The files designated are stored in either the central game processor 12, the master processing units 14 or the slave terminals 16 depending upon the file type and its usage.

| | Configuration Files |
|---|---|
| SITE.CFG | site specific information: name, phone number, etc. |
| USER.CFG | users and passwords |
| OPTION.CFG | configurable options |
| SLAVE.CFG | state of slave terminals (enabled or disabled) |
| GAME.MAP | relates pools to active games |
| | Report Files |
| EVENT.LOG | sequential record of key system events |
| STATUS.RPT | current system status |
| AUDITxx.RPT | status of all the slave terminals 16 |

Four files are also provided for each pool of game tickets, which identify the game serial number and a description of the aspects of each game. These game files are set forth below.

| | Game Files |
|---|---|
| FORMxxxx.CFG | game configuration information, (i.e., rows, size, etc.) |
| FORMxxxx.HDR | header file for no. of winning ticket combinations and amounts |
| FORMxxxx.DEF | ticket definitions and symbols |
| FORMxxxx.DST | ticket distribution (i.e., how many of what type) |
| | Validation Files |
| VALIDATE.REC | 50 validation records (assigned and free) |
| VALIDATE.STT | validation state (most recent seq # & date) |
| | Other Files |
| AUDIT.PTG | File of 20 records containing audit information about each slave terminal 16. |
| CMDRSP.PTG | File of 20 records containing command/response block for each slave terminal 16. |
| GAMHDRx.PTG | File of the Game Header, where xx = 01-12 depending on game number. |
| SYSMSG.PTG | File of messages for slave terminal 16 and master processing unit 14. Each record is 80 bytes long, and is indexed by record number. |

In the preferred embodiment of the invention, software is provided at the central game processor 12 to convert the raw symbol data entered by the operators into the video ticket data mentioned above. For example, one file, CVTPTI.EXE, is employed to convert the raw symbol data into the four game files identified above.

Set forth in Table 1 is a preferred configuration of an audit record prepared by the master processing unit 14 to be completed for each of the slave terminals 16. The record appearing in Table 1 represents 1 of 20 such sequential records arranged in the file AUDIT.PTG for each slave terminal 16 coupled to the LAN 20.

GAMHDRxx.PTG, where "xx" represents the game number.

TABLE 1

| Byte | Description | | |
|------|-------------|---|---|
| 00 | MM (BCD) | Date | |
| 01 | DD (BCD) | Initialized | |
| 02 | YY (BCD) | Gregorian Format | |
| 03 | HH (BCD) | Time | |
| 04 | MM (BCD) | Initialized | |
| 05 | SS (BCD) | (24 Hr Format) | |
| 06 | Total Tickets Played | (BCD Digits 5,4) | M |
| 07 | Total Tickets Played | (BCD Digits 3,2) | A |
| 08 | Total Tickets Played | (BCD Digits 1,0) | S |
| 09 | Total Coins In | (BCD Digits 5,4) | T |
| 0A | Total Coins In | (BCD Digits 3,2) | E |
| 0B | Total Coins In | (BCD Digits 1,0) | R |
| 0C | Total Bills In/4 | (BCD Digits 5,4) | |
| 0D | Total Bills In/4 | (BCD Digits 3,2) | |
| 0E | Total Bills In/4 | (BCD Digits 1,0) | M |
| 0F | Total Bet | (BCD Digits 5,4) | E |
| 10 | Total Bet | (BCD Digits 3,2) | T |
| 11 | Total Bet | (BCD Digits 1,0) | E |
| 12 | Total Won | (BCD Digits 5,4) | R |
| 13 | Total Won | (BCD Digits 3,2) | |
| 14 | Total Won | (BCD Digits 1,0) | |
| 15 | Total Cashed Out | (BCD Digits 5,4) | |
| 16 | Total Cashed Out | (BCD Digits 3,2) | |
| 17 | Total Cashed Out | (BCD Digits 1,0) | |
| 18 | (Reserved) | | |
| 19 | (Reserved) | | |
| 1A | (Reserved) | | |
| 1B | (Reserved) | | |
| 1C | (Reserved) | | |
| 1D | (Reserved) | | |
| 1E | (Reserved) | | |
| 1F | (Reserved) | | |
| 20 | MM (BCD) | Date | |
| 21 | DD (BCD) | Initialized | |
| 22 | YY (BCD) | Gregorian Format | |
| 23 | HH (BCD) | Time | |
| 24 | MM (BCD) | Initialized | |
| 25 | SS (BCD) | (24 Hr Format) | |
| 26 | Total Tickets Played | (BCD Digits 5,4) | P |
| 27 | Total Tickets Played | (BCD Digits 3,2) | E |
| 28 | Total Tickets Played | (BCD Digits 1,0) | R |
| 29 | Total Coins In | (BCD Digits 5,4) | I |
| 2A | Total Coins In | (BCD Digits 3,2) | O |
| 2B | Total Coins In | (BCD Digits 1,0) | D |
| 2C | Total Bills In/4 | (BCD Digits 5,4) | |
| 2D | Total Bills In/4 | (BCD Digits 3,2) | |
| 2E | Total Bills In/4 | (BCD Digits 1,0) | M |
| 2F | Total Bet | (BCD Digits 5,4) | E |
| 20 | Total Bet | (BCD Digits 3,2) | T |
| 21 | Total Bet | (BCD Digits 1,0) | E |
| 22 | Total Won | (BCD Digits 5,4) | R |
| 23 | Total Won | (BCD Digits 3,2) | |
| 24 | Total Won | (BCD Digits 1,0) | |
| 25 | Total Cashed Out | (BCD Digits 5,4) | |
| 26 | Total Cashed Out | (BCD Digits 3,2) | |
| 27 | Total Cashed Out | (BCD Digits 1,0) | |
| 28 | (Reserved) | | |
| 29 | (Reserved) | | |
| 2A | (Reserved) | | |
| 2B | (Reserved) | | |
| 2C | (Reserved) | | |
| 2D | (Reserved) | | |
| 2E | (Reserved) | | |
| 2F | (Reserved) | | |

Set forth in Table 2 is a sample game file used in the preferred embodiment of the gaming system 10. Each game file contains the necessary parameters to define each game. The first symbol (Symbol #1) provide din the game file is the symbol that appears in the upper left-hand corner of the video ticket 164 displayed on each color monitor 110 (see FIGS. 15-17). In the preferred embodiment, the gaming system 10 also includes headers for each game offered on the system. Each game header is stored in a separate file called

TABLE 2

| Byte | Description | |
|------|-------------|---|
| 00 | FORM NUMBER (BCD) | FORM NUMBER (BCD) |
| 01 | FORM NUMBER (BCD) | FORM NUMBER (BCD) |
| 02 | SERIAL # (BCD) | SERIAL # (BCD) |
| 03 | SERIAL # (BCD) | SERIAL # (BCD) |
| 04 | SERIAL # (BCD) | SERIAL # (BCD) |
| 05 | SERIAL # (BCD) | SERIAL # (BCD) |
| 06 | CREDITS PER TICKET (1-4) HEX | |
| 07 | (Reserved) | |
| 08 | (Reserved) | |
| 09 | (Reserved) | |
| 0A | (Reserved) | |
| 0B | (Reserved) | |
| 0C | (Reserved) | |
| 0D | (Reserved) | |
| 0E | (Reserved) | |
| 0F | (Reserved) | |
| 10 | # of Symbols/Window (BCD) | # of Windows (BCD) |
| 11 | # of Total Symbols used in the Game (Hex) | |

The form number and serial number for each game appears at the top of each header file at locations 00H and 01H. The form number for each game is preferably three digits; the unused bit in the file is thus zero-filled. For example, Form #720 would be entered as "0720". The serial number is handled in the same manner.

Referring to FIG. 18, the four files listed above under the Other Files designation consist of files used for communication between the master processing units 14 and the slave terminals 16. As shown in FIG. 18, the file CMDRSP.PTG 180 comprises a record of the commands and responses received or transmitted by each slave terminal 16. Each slave terminal 16 reads commands written to this file by the master processing unit 14, and each slave terminal 16 writes its response to this file to be read by the master processing unit 14. The location of this file in the master processing units 14 is identified in FIG. 19 (Command Queues 208). A detailed description of the preferred commands and responses employed on the gaming system 10 is provided below.

The file AUDIT.PTG 182 comprises a record of the status for each slave terminal 16. Slave terminal 16 status is written to the file by each slave terminal 16 on command from the master processing unit 14. The information stored in this file is processed by the master processing units 14 to generate the audit report for the system administrator.

As shown in FIG. 18, both the SYSMSG.PTG 184 file and the GAMHDRxx.PTG 186 file are files employed in a unidirectional manner; data is written to each by the master processing unit 14 to be read by the slave terminal 16. In the file SYSMSG.PTG 184, system messages are stored to be broadcast on each slave terminal 16 as defined by the master administrator. Each slave terminal 16 also reads the particular GAMHDRxx.PTG file 186 necessary to configure the slave terminal 16 for the particular game to be played. The master processing unit 14 writes the GAMHDRxx.PTG files 186, one for each game supported, when the game is activated.

Figure 19:
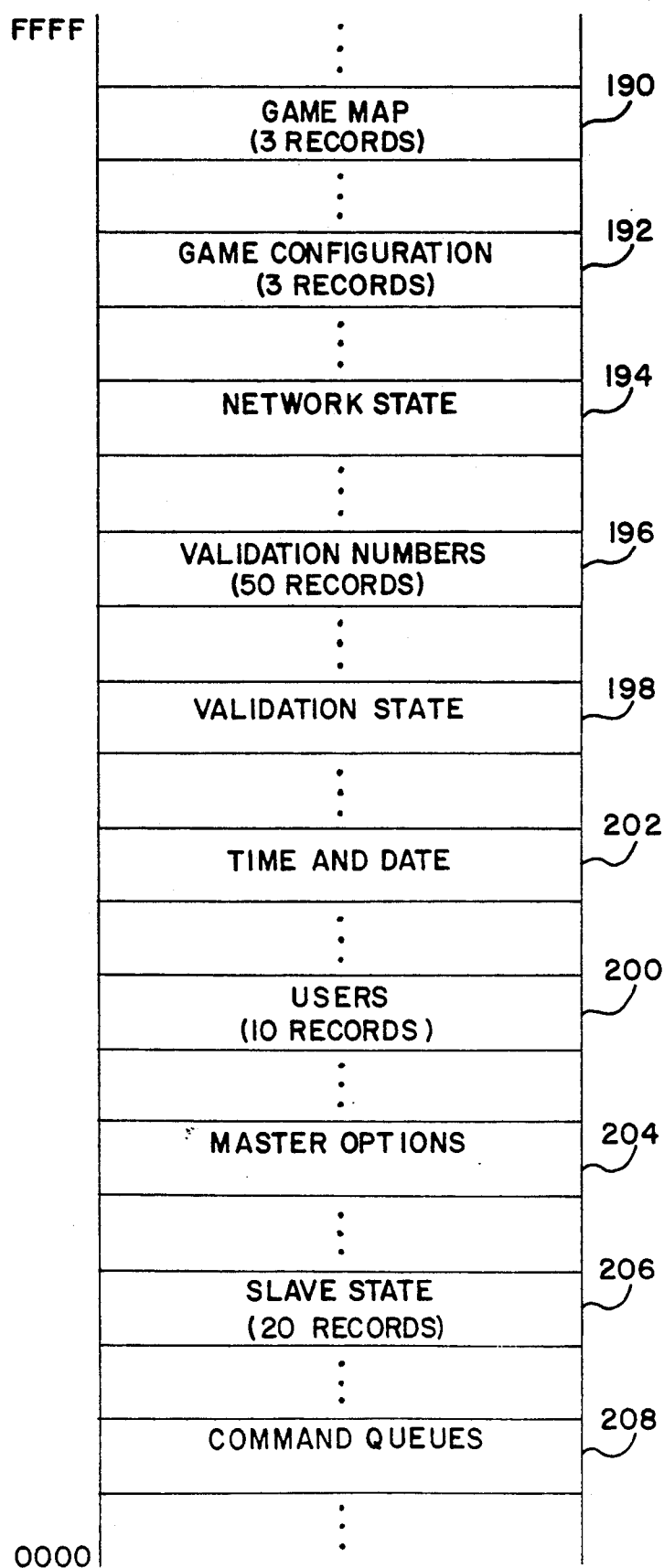
FIG. 19 is a depiction of the globally accessible data structures employed in the gaming system shown in FIG. 1.

Referring to FIG. 19, a number of globally accessible data structures are also provided in the gaming system 10. These structures also correspond to the Other Files listed above and are located in the memory map of each master processing unit 14. The Game Map structure 190 consists of three records which relate games in the inventory stored at each master processing unit 14 to currently active games. The Game Configuration data structure 192 also consists of three records that provide detailed information about the active games on the system. The Game Configuration structure 192 thus includes the game name, form number, size, number of rows and columns, symbols, number of tickets remaining in the pool, the shuffled pool itself, and ticket definitions. There is also a Network State structure 194 that stores a representation of the state of each master processing unit's 14 local area network 20.

Data structures are also provided for validation and user identification. Two structures define the Validation Numbers 196 supplied when a player cashes out, as well as the Validation State 198. The Validation Numbers 196 consist of 1000 records comprising the outstanding validation numbers provided to players who have cashed out, as well as the remaining unassigned numbers. The Validation State 198 lists the next sequence number for a validation ticket and a modified julian date. The User file 200 consists of ten records including the names, passwords and access levels of each administrator, as well as unassigned numbers. A data structure also exists for the Time and Date 202.

Other structures in the gaming system 10 include a file for master processing unit 14 options, the state of each slave terminal 16 and command queues. The Master Option file 204 contains configurable options such as show cards, broadcast winners and shut down information. The Slave State records 206 describe the status of each slave terminal 16 with respect to the command/response cycle. The Command Queue 208 is a storage record for slave terminal commands including audit, shut down, reset and broadcast information, and is used in conjunction with the CMDRSP.PTG file 180 shown in FIG. 18.

In one preferred embodiment of the gaming system 10, a menu of commands/options is provided at the master processing units 14. After the gaming system 10 is initialized and the master administrator has completed logging onto the master processing unit 14, a menu routine is executed. The main options available on the menu include validation/administration commands, reporting functions and system service options. Commands displayed on the menu correspond to the programs and data files described above.

In one embodiment, the game symbols displayed on the back of a video ticket 164 are slightly larger than those displayed on the front of the ticket 164. As a result, two sets of symbol definitions are required for each game. In this embodiment, a file labeled FORMxxxx.FAC includes the graphics for the ticket face, and a file labeled FORMxxxx.BAC contains the graphics for the back of the video ticket 164. A third file, FORMxxxx.PAL, includes palette definitions.

As mentioned, the color monitor 110 displays the number of tickets 164 remaining in each game being played in a field 168 appearing on slave terminal color monitor 110 (FIG. 14). For each play that turns up a winner, therefore, a message in the form "WIN $XXX" appears on each color monitor 110. The game's six digit serial number also appears on the bottom of each display.

An editing mechanism is preferably provided to allow up to six messages to be communicated between each master processing unit 14 and the slave terminals 16 as defined in connection with the CMDRSP.PTG file 180. To ease implementation, each message is assigned a number from one to six. Further examples of the substance of such messages include: (1) "The facility is going to close"; (2) broadcast information about a winner; (3) "Ticket level low"; (4) a particular game is now closed; and (5) "We are closed . . . Goodnight". The master administrator controls distribution of these messages to each of the slave terminals 16 via the files defined above.

As stated, the master administrator also has access to some options that may be turned on or off as the administrator desires. Options accessible to the administrator are defined in the Master Options data structure 204 (FIG. 19), and include for example: (1) whether the slave terminal 16 displays to the player the number of plays remaining in a game; (2) whether winning ticket amounts are broadcast to other slave terminals 16; (3) the amount of time in which to display the closing announcement; (4) whether the low ticket level message should be broadcast, and if so, at what percentage of plays remaining; and (5) whether the optional printer 88 is attached to the master computer 70 (see FIG. 5).

Depending on whether the optional printer 88 is coupled to the master computer 70, the master administrator is capable of sending reports both to the printer 88 or to the monitor 82 (FIG. 5). Audit information is first displayed or printed for each slave terminal 16, and then a summary of all slave terminal 16 information is provided. This information can also be communicated over the modem 24 to the central game processor 12 in a preferred embodiment. Table 3 contains a general listing of the information contained in the audit reports.

TABLE 3

| Game ID/Serial No. | Each Slave Terminal 16 |
|---|---|
| Serial Number | Game ID or Serial Number |
| Plays Remaining | Starting Plays |
| Date/Time of Report | Plays Remaining |
| Amount Left to Win | Audit Information |

Information included for each slave terminal 16 includes the date and time the slave terminal 16 was initialized, the number of video tickets 164 played, the number of coins and bills received, the total amount bet and won, and the total amount cashed out.

The master administrator can preferably disable a game from the master processing unit 14 at any time. In addition, the master administrator can queue games to be automatically loaded after the game pool currently played is exhausted. If games are queued in this manner, the succeeding game will share the same form number as the game currently being played so that new game symbols need not be down-loaded to the slave terminal 16 while the game is in progress. Thus, the master administrator is capable of observing the status of the games being played, and also which games remain in the inventory of games stored at the master processing units 14. Games listed in the inventory are, therefore, turned on and made active by the master administrator.

The following tasks can be performed on-line at the master processing units 14, while games are being played: (1) display game status; (2) display slave terminal/network status; (3) disable a game; (4) display inventory; (5) edit system messages; and (6) queue like forms. The following tasks are performed off-line: 1) display/change system options/flags and send broadcast information; and (2) set up service/site information within a file.

Table 4 includes a preferred listing of the commands used in a preferred embodiment of the gaming system 10. As described above, commands are transmitted from the master processing units 14 to the slave terminals 16. Responses are transmitted from the slave terminals 16 to the master processing units 14.

TABLE 4

| Command | Definition |
|---------|------------|
| CMD 01 | Transmit Status/Tickets Total & Remaining |
| CMD 02 | Receive Ticket/Symbol Definitions |
| CMD 03 | Receive Validation # and $$$ Amount |
| CMD 04 | Receive Network Broadcast Information |
| CMD 05 | Power Down Sequence |
| CMD 06 | Copy Slave Audit Info. to AUDIT record |
| CMD 07 | Requested Ticket Cannot Be Sent—Pool Empty |
| CMD 08 | Initialize All Meters |
| CMD 09 | Initialize Period Meters only |
| CMD 10 | Request Denied |
| CMD 11 | Force Down Sequence |
| CMD 12 | Restart Unit |

Responses to the commands identified in Table 4 are set forth in Table 5. Responses to Commands #2, #3, #4 and #5 should be Response #1 indicated in Table 5. The response to Command #1 can be any of the responses appearing in Table 5.

TABLE 5

| Response | Definition |
|----------|------------|
| RESP 01 | All is well |
| RESP 02 | Send a new ticket |
| RESP 03 | Send a validation Number |
| RESP 04 | Winning Ticket Just Displayed |
| RESP 05 | Power down acknowledge |
| RESP 06 | Send temporary validation number |

Command #4 is the broadcast message command initiated at the master processing unit 14. The contents of the message to be displayed will have been previously defined and stored on the master processing unit 14 (in file SYSMSG.PTG 184). Command #5 is a power-down sequence command. In response to Command #5, the slave terminals 16 should display an appropriate message to the player, such as "PLEASE CASH OUT ... WE ARE SHUTTING DOWN IN ( ) MINUTES ..." After Command #5 has been sent, no more credits can be purchased. When the cash out transaction is completed, the slave terminals 16 should be placed out of service, i.e., not allowing any additional plays to be purchased or money to be inserted.

As mentioned, each master processing unit 14 requests status information from each slave terminal 16. Command #6 has been reserved for this purpose. In response to Command #6, the slave terminals 16 update the appropriate record in the AUDIT.PTG 182 file, and conclude with Response #1. The master processing unit 14 will then collate this data and display or print it for the system administrator.

Commands #7 and #8, when issued by the master processing unit 14, cause the slave terminals 16 to clear the appropriate software meters 64. A detailed description of the commands and data communicated over the local area network 20, and the responses received, appears below.

A. Command #1: Update Your Status

This command from the master processing unit 14 allows the slave terminal 16 to:
1. Request a video ticket;
2. Request a Validation Number;
3. Know the total play count of a pool (BEGIN); or
4. Know the current play count of a pool (LEFT).
5. Transmit status.

| Data Packet | | |
|---|---|---|
| Transmit Status | UNIT NUMBER<br>Command 01H<br>Response 00H | CMD byte 1<br>CMD byte 2<br>CMD byte 3 |
| 00Hex - FFHex | Game Number (01-0C) | data 04 |
| " | Total plays byte 1 | data 05 |
| " | To al plays byte 2 | data 06 |
| " | Total plays byte 3 | data 07 |
| " | Total plays byte 4 | data 08 |
| " | Total plays byte 5 | data 09 |
| " | Total plays byte 6 | data 0A |
| " | Plays remaining byte 1 | data 0B |
| " | Plays remaining byte 2 | data 0C |
| " | Plays remaining byte 3 | data 0D |
| " | Plays remaining byte 4 | data 0E |
| " | Plays remaining byte 5 | data 0F |
| " | Plays remaining byte 6 | data 10H |
| | | |
| | 00 | data 53H |

For example, if Game #5 started with 3600 plays, and had 290 left, the data bytes would be filled out as follows:

| | 05 Hex | (Game #) | data 01 |
|---|---|---|---|
| 00Hex - FFHex | 10 Hex | (Start ) | data 02 |
| " | 0E Hex | | data 03 |
| " | 00 | | data 04 |
| " | 00 | | data 05 |
| " | 00 | | data 06 |
| " | 00 | | data 07 |
| " | 01 Hex | (Plays | data 08 |
| " | 22 Hex | left) | data 09 |
| " | 00 | | data 04 |
| " | 00 | | data 05 |
| " | 00 | | data 06 |
| | | | |
| " | 00 | | data 53 |
| " | | | |

B. Response #1: All is well

This response indicates to the master processing unit 14 that the slave terminal 16 is operating normally, that a play has not been requested, and that a validation number is not required at this time. This is the correct response if:
1. A video ticket has been successfully received;
2. A validation number has been successfully received;
3. Meters have been successfully cleared;
4. The requested message has been displayed; or
5. Audit information is ready.

Normally, for the program to transmit this response, it will be in response to Command #1.

| Data Packet | | |
|---|---|---|
| All Is Well: | Unit Number<br>Command<br>Response 01 | CMD byte 1<br>CMD byte 2<br>CMD byte 3 |
| | | data 04 |
| | | data 05 |
| | | data 06 |
| | | data 07 |
| | | data 08 |
| | | data 09 |

| Data Packet | |
|---|---|
| | data 0A |
| | data 0B |
| | data 0C |
| | data 0D |
| | data 0E |
| | data 0F |
| | data 010 |
| 00 | data 53H |

C. Command #2: Receive a Video Ticket/Symbol Definition

This command from the master processing unit 14 results when a slave terminal 16 has previously transmitted the "SEND A TICKET" (Response #2) response. It allows the slave terminal 16 to receive and evaluate a new play from the requested pool of game plays. The Tabs and symbol windows (Wind) are defined as follows:

| Tab1 | Tab1 | Tab1 | Tab1 | Tab1 |
|---|---|---|---|---|
| Wind 1 | Wind2 | Wind3 | Wind4 | Wind5 |
| Tab2 | Tab2 | Tab2 | Tab2 | Tab2 |
| Wind 1 | Wind2 | Wind3 | Wind4 | Wind5 |
| Tab3 | Tab3 | Tab3 | Tab3 | Tab3 |
| Wind 1 | Wind2 | Wind3 | Wind4 | Wind5 |
| Tab4 | Tab4 | Tab4 | Tab4 | Tab4 |
| Wind 1 | wWind2 | Wind3 | Wind4 | Wind5 |
| Tab5 | Tab5 | Tab5 | Tab5 | Tab5 |
| Wind 1 | Wind2 | Wind3 | Wind4 | Wind5 |

If not window or tab exists for a particular game, the data should be set to 00, e.g., a 3-tab ticket with only 3 windows per tab.

| | Data Packet | |
|---|---|---|
| Receive a Play | Unit Number | CMD byte 1 |
| | Command 02 | CMD byte 2 |
| | Response | CMD byte 3 |
| 04 | Game Number (01-0C) | data |
| | Tab 1 Window # 01 | data 05 |
| | Tab 1 Window # 02 | data 06 |
| | Tab 1 Window # 03 | data 07 |
| | Tab 1 Window # 04 | data 08 |
| | Tab 1 Window # 05 | data 09 |
| | Tab 2 Window # 01 | data 0A |
| | Tab 2 Window # 02 | data 0B |
| | Tab 2 Window # 03 | data 0C |
| | Tab 2 Window # 04 | data 0D |
| | Tab 2 Window # 05 | data 0E |
| | Tab 3 Window # 01 | data 0F |
| | Tab 3 Window # 02 | data 10 |
| | Tab 3 Window # 03 | data 11 |
| | Tab 3 Window # 04 | data 12 |
| | Tab 3 Window # 05 | data 13 |
| | Tab 4 Window # 01 | data 14 |
| | Tab 4 Window # 02 | data 15 |
| | Tab 4 Window # 03 | data 16 |
| | Tab 4 Window # 04 | data 17 |
| | Tab 4 Window # 05 | data 18 |
| | Tab 5 Window # 01 | data 19 |
| | Tab 5 Window # 02 | data 1A |
| | Tab 5 Window # 03 | data 1B |
| | Tab 5 Window # 04 | data 1C |
| | Tab 5 Window # 05 | data 1D |
| | Win Amount xx | data 1F |
| | Win Amount xx | data 20 |
| | 00 | data 53 |

Symbols are ordered as follows:

| TAB A | sym 01 | sym 02 | sym 03 | sym 04 | sym 05 |
|---|---|---|---|---|---|
| TAB B | sym 06 | sym 07 | sym 08 | sym 09 | sym 10 |
| TAB C | sym 11 | sym 12 | sym 13 | sym 14 | sym 15 |
| TAB D | sym 16 | sym 17 | sym 18 | sym 19 | sym 20 |
| TAB E | sym 21 | sym 22 | sym 23 | sym 24 | sym 25 |

In a pool having five total symbols, and a game with three tabs only, assume the following correlation has been defined:

| 1 = heart | 2 = club | 3 = spade | 4 = diamond | 5 = crown |
|---|---|---|---|---|

If the video ticket to be displayed looks like this:

| heart | club | heart |
|---|---|---|
| club | heart | spade |
| club | spade | diamond |

And the game number is 11:

| Game Number 0B Hex | data 04 |
|---|---|
| 01 Hex | data 05 |
| 02 Hex | data 06 |
| 01 Hex | data 07 |
| 02 Hex | data 08 |
| 01 Hex | data 09 |
| 03 Hex | data 0A |
| 02 Hex | data 0B |
| 03 Hex | data 0C |
| 04 Hex | data 0D |
| 00 Hex | data 0E |
| xx Hex | data 0F |
| xx Hex | data 10 |
| 00 Hex | |
| 00 Hex | data 53 |

D. Response #2: Send a Ticket

This response will be transmitted to the master processing unit 14 if the player has made a valid request for a play. In this case, the player must have credits, and must have pressed the Play pushbutton 166.

| | Data Packet | |
|---|---|---|
| | UnitNumber | CMD byte 1 |
| | Command | CMD byte 2 |
| Send a Ticket: | Response 02 | CMD byte 3 |
| | Game Number (01.0C) | data 04 |
| | | data 05 |
| | | data 06 |
| | | data 08 |

-continued

| Data Packet |
|---|
| data 53 |

E. Command #3: Receive a Validation Number

This command from the master processing unit 14 is generated in response to the slave terminal 16 sending Response #3—Request Validation Number.

| Data Packet | | | |
|---|---|---|---|
| Receive Valid. # | Unit Number<br>Command 03<br>Response | | CMD byte 1<br>CMD byte 2<br>CMD byte 3 |
| 0 BCD - 99 BCD | THOUSANDS | HUNDREDS | data 04 |
| 0 BCD - 99 BCD | TENS | UNITS | data 05 |
| 0 BCD - 99 BCD | TENTHS | HUNDREDTHS | data 06 |
| 0 Hex - 7F Hex | Validation number 1 | | data 07 |
| " | Validation number 2 | | data 08 |
| " | Validation number 3 | | data 09 |
| " | Validation number 4 | | data 0A |
| " | Validation number 5 | | data 0B |
| " | Validation number 6 | | data 0C |
| " | Validation number 7 | | data 0D |
| " | Validation number 8 | | data 0E |
| " | Validation number 9 | | data 0F |
| " | Validation number 10 | | data 10 |
| " | Validation number 11 | | data 1 |
| | | | data 53 |

If the master processing unit 14 sends the validation number "0234AJUN93" for the amount of $10.50, the packet would appear as follows:

| | | |
|---|---|---|
| BCD - 99 BCD | 00 Hex | data 04 |
| BCD - 99 BCD | 10 Hex | data 05 |
| BCD - 99 BCD | 50 Hex | data 06 |
| Hex - 7F Hex | 30 Hex | data 07 |
| | 32 Hex | data 08 |
| | 33 Hex | data 09 |
| | 34 Hex | data 0A |
| | 41 Hex | data 0B |
| | 4A Hex | data 0C |
| | 55 Hex | data 0D |
| | 4E Hex | data 0E |
| | 39 Hex | data 0F |
| | 33 Hex | data 10 |
| | 20 Hex | data 11 |
| | 00 | data 53 |

Note that unused codes are space filled (20H).

F. Response #3: Send a Validation Number

This response is transmitted to the master processing unit 14 if the player has made a valid request to cash out. In this case, the player must have credits, and must have hit the Cash Out pushbutton 172. The response also transmits the amount being cashed out. This information is preferably used by the master processing unit 14 to help create the validation number.

| Data Packet | | | |
|---|---|---|---|
| Send Valid. # | Unit Number<br>Command 03<br>Response 03 | | CMD byte 1<br>CMD byte 2<br>CMD byte 3 |
| 0 BCD - 99 BCD | THOUSANDS | HUNDREDS | data 04 |
| 0 BCD - 99 BCD | TENS | UNITS | data 05 |
| 0 BCD - 99 BCD | TENTHS | HUNDREDTHS | data 06 |
| | | | data 07 |
| | | | data 08 |
| | | | data 09 |
| | | | data 0A |
| | | | data 53 |

G. Command #4: Receive Broadcast Information

This command from the master processing unit 14 will transmit a message to one or more of the slave terminals 16. It will request that a message number previously stored in the slave terminal 16 be displayed on the screen. Up to two parameters can be inserted into the message. Where the message itself contains "ESC 1" or "ESC 2" characters the parameters are inserted in those positions. Bytes not displayed are encoded as 00H.

| Data Packet | | |
|---|---|---|
| Receive Message | Unit Number<br>Command 05<br>Response 04 | CMD byte 1<br>CMD byte 2<br>CMD byte 3 |
| Hex - 0A Hex | Message Number (01-0A) | data 04 |
| Hex - 7F Hex | Param1Byte 1 | data 05 |

-continued

| | Data Packet | |
|---|---|---|
| " | Param1Byte 2 | data 06 |
| " | Param1Byte 3 | data 07 |
| " | Param1Byte 4 | data 08 |
| " | Param1Byte 5 | data 09 |
| " | Param1Byte 6 | data 0A |
| " | Param2Byte 1 | data 0B |
| " | Param2Byte 2 | data 0C |
| " | Param2Byte 3 | data 0D |
| " | Param2Byte 4 | data 0E |
| " | Param2Byte 5 | data 0F |
| " | Param2Byte 6 | data 10 |
| | | | |
| | | data 53 |

If message #5 was previously defined to be:
"We have a winner of $ESC 1 on MegaTab $ESC 2!!!" and the message to be displayed is:
"We have a winner of $100 on MegaTab 25!!!"
Then the following would be transmitted:

| 05 Hex | data 01 |
|---|---|
| 31 Hex | data 02 |
| 30 Hex | data 03 |
| 30 Hex | data 04 |
| 00 Hex | data 05 |
| 00 Hex | data 06 |
| 00 Hex | data 07 |
| 32 Hex | data 08 |
| 35 Hex | data 09 |
| 21 Hex | data 0A |
| 21 Hex | data 0B |
| 00 Hex | data 0C |
| | | |
| 00 | data 53 |

H. Command #5: Power Down Sequence

This command from the master processing unit 14 requests the slave terminal 16 to issue a "We are about to power down, please press cash out!" message. It will allow up to one parameter to be inserted into the message, e.g., the time until Power Down.

| | Data Packet | |
|---|---|---|
| Power Down | Unit number<br>Command 06<br>Response | CMD byte 1<br>CMD byte 2<br>CMD byte 3 |
| 00 Hex - FF Hex<br>" | Remaining (MSB-HI)<br>Remaining (MSB-LO)<br>|<br>|<br>above is in seconds,<br>from 0000 to FFFF<br>| | data 04<br>data 05<br>data 06<br>data 07<br>data 08<br>data 09<br>data 0A |
| | |<br>| | data 0B<br>data 53 |

For example, if the Power Down time is five minutes ahead of when it actually will happen, then the following packet would be transmitted:

| | | |
|---|---|---|
| 00 Hex - FF Hex | 01 Hex | data 01 |
| " | 2C Hex | data 02 |
| | | | data 03 |
| | | | data 04 |
| | above is in seconds, | data 05 |
| | 12CH = 300 = 5 minutes | data 06 |
| | | | data 07 |
| | | | data 08 |
| | | data 09 |
| | | data 0A |
| | | data 0B |
| | | | |
| | | | data 53 |

I. Command #6: Update Audit Information

This command from the master processing unit 14 requests the slave terminal 16 to update its audit information located in file AUDIT.PTG 182.

| | Data Packet | |
|---|---|---|
| Audit Information | Unit Number<br>Command 06<br>Response | CMD byte 1<br>CMD byte 2<br>CMD byte 3 |
| | 00 | data 53 |

J. Command #7: Requested Play Cannot Be Sent—Pool Empty

This command from the master processing unit 14 informs the slave terminal 16 that the last play request cannot be filled.

| | Data Packet | |
|---|---|---|
| Deck Empty: | Unit number 0<br>Command 07<br>Response<br>Game Number (01.0C)<br>|<br>|<br>| | CMD byte 1<br>CMD byte 2<br>CMD byte 3<br>data 04<br>data 05<br>data 06<br>data 07<br>data 53 |

K. Response #4: Winning Play Ticket Just Displayed

This response indicates to the master processing unit 14 that a slave terminal 16 has just displayed a winning play. (It is up to the administrator to decide whether to display this information.)

| | Data Packet | | |
|---|---|---|---|
| I've Won!!!: | Unit Number<br>Command<br>Response 04 | | CMD byte 1<br>CMD byte 2<br>CMD byte 3 |
| 00 BCD - 99 BCD | THOUSANDS | HUNDREDS | data 04 |
| 00 BCD - 99 BCD | TENS | UNITS | data 05 |
| 00 BCD - 99 BCD | TENTHS | HUNDREDTHS | data 06 |
| | | | | data 07 |
| | | | | data 53 |

Table 6 includes a list of the make and model of elements employed in the presently preferred embodiment of the gaming system 10.

TABLE 6

| Ref. # | Item | Description | Manufacturer |
|---|---|---|---|
| 20 | Local area network | Lantastic | Artisoft, Inc. |
| 44 | Keyboard | Type 101 | Keytronics |
| 136 | Printer | Laser Printer | Epson America, Inc. |
| 112 | Printer | 40-column printer | Star Micronics, Inc. |
| (N/A) | Bios type | Basic I/O System | American Megatrends, Inc. |
| 146 | Sound generator | AY-3-8940 | Yamaha Corp. |
| 148 | Darlington Drive | UNL-2003A | Motorola, Inc. |
| 80 | LAN Interface | Lantastic | Artisoft, Inc. |
| 102 | LAN Interface | Lantastic | Artisoft, Inc. |
| 86 | Keyboard | Type 101 | Keytronics |

There has been described a computerized gaming system that provides fixed pools of games to be played by players on the system. According to a preferred embodiment of the invention, the gaming system is distributed between a central game processor, master processing units and slave terminals. The fixed pools of game plays are created at the central game processor and downloaded to the master processing units upon request. Through the slave terminals, players can purchase game plays from each fixed pool of plays received and stored at the master processing unit to which the slave is attached.

In the preferred embodiment, a game play corresponds to a video representation of a paper pull-tab lottery ticket. As in the paper pull-tab lottery game, a predetermined number of winning and losing tickets is established for each pool of game plays. Also, a predetermined dollar value for winning plays is included with each game pool. According to the invention, therefore, each player can purchase game plays from the entire fixed pool being stored at the master processing unit to which a slave terminal is connected. Since multiple slave terminals are contemplated for connection to each master processing unit, a single player may compete against other players located at similar slave terminals to purchase as many of the winning tickets in each fixed pool as possible.

The gaming system described above thus combines the advantages of paper lottery and wagering games with the popularity and attractiveness of the video game. As described, each player can compete directly with other players for the purchase of winning plays, thus providing an element of competition over the prior paper pull-tab lottery games. Since it is contemplated that slave terminals may be located either within the same location or remotely from one another, players can also compete with other players both locally and across great distances. The excitement, sounds and visual display inherent in a video game provides further attraction of the computer gaming system over the prior paper lottery type games.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of this invention.

We claim:

1. A gaming system network comprising:

a master processing unit, the master processing unit operative to distribute game plays from a finite pool of game plays a memory device coupled to the master processing unit, the memory device operative to store at least one finite pool of game plays, each finite pool containing a predefined number of winning and loading play records wherein each game play record contains an indication of whether the particular play constitutes a winning or losing play and the amount won;

a communication interface coupled to the master processing unit;

a plurality of slave terminals, each slave terminal coupled to the communication interface to receive game play records in response to a game play request received from a player;

a plurality of player-controlled selection devices, each player-controlled selection device coupled to a slave terminal and operative to transmit game play requests from the player to the master processing unit; and a plurality of output devices, each output device coupled to a slave terminal and operative to communicate to the player the receipt of a winning or losing play and the amount won.

2. The game system network defined in claim 1, wherein a plurality of players can simultaneously operate the player-controlled selection devices provided on the plurality of slave terminals to request game play records from the entire fixed pool of game play records stored in the memory device.

3. The gaming system network defined in claim 1, wherein the communication interface comprises a local area network.

4. The gaming system network defined in claim 1, wherein each slave terminal further comprises a processing element, a display, a local area network interface, and a wager deposit device.

5. The gaming system network defined in claim 4, wherein the processing element is coupled to the player-controlled selection device and comprises a personal computer.

6. The gaming system network defined in claim 1, wherein the player-controlled selection device comprises a push-button.

7. The gaming system network defined in claim 1, wherein the master processing unit comprises a personal computer.

8. The gaming system network defined in claim 1, wherein the master processing unit comprises means for maintaining a record of the number of game play records selected at each slave terminal from each finite pool of game play records and the number of game play records remaining in each finite pool of game play records stored at the memory device.

9. The gaming system network defined in claim 1, further comprising a central game processor for generating the at least one finite pool of game plays, and a communication interface coupled between the master processing unit and central game processor and operative to supply for each finite pool of game plays the predefined number of winning and losing play records to the master processing unit.

10. The gaming system network defined in claim 9, wherein the central game processor comprises means for supplying a new finite pool of game plays to the master processing unit upon exhaustion of each finite pool of game play records stored at the memory device.

11. The gaming system network defined in claim 9, wherein the central game processor comprises means for maintaining a record of the number of game plays remaining in each finite pool of game plays and the number of winning and losing play records remaining in each finite pool of game plays.

12. The gaming system network defined in claim 9, wherein the communication interface comprises a modem.

13. The gaming system network defined in claim 9, wherein the central game processor further comprises a personal computer.

14. The gaming system network defined in claim 1, wherein each game play record comprises an electronically-simulated pull-tab lottery ticket.

15. A gaming system network comprising:
master means for distributing game plays from a fixed pool of game plays;
means for storing at least one fixed pool of game plays, coupled to the master means, each fixed pool having a predetermined number of winning and losing game play records wherein each game play record contains an indication of whether the particular play constitutes a winning or losing play and the amount won;
interface means, coupled to the master means, for communicating game play records from the means for storing in response to game play requests;
a plurality of slave means, coupled to the interface means, for receiving game play records from the master means in response to game play requests received from a player;
player-controlled selection means, coupled to a slave means, for transmitting game play requests from the player to the master means; and
output means, coupled to a slave means, for communicating to the player the receipt of a winning or losing play and the amount won.

16. A gaming system network comprising:
a master processing unit, the master processing unit operative to distribute game play records from a finite pool of game play records;
a memory device coupled to the master processing unit, the memory device operative to store at least one finite pool of game play records, each finite pool of game play records containing a predefined number of winning and losing play records wherein each game play record contains an indication of whether the particular game play constitutes a winning or losing play and the amount won;
a communication interface for coupling the slave terminals on line to the master processing unit;
a plurality of slave terminals, each slave terminal coupled to the communication interface to receive game play records from the memory device in response to a game play request received from a player;
a plurality of player-controlled selection devices, each player-controlled selection device coupled to a slave terminal and operative to transmit game play requests from the player to the master processing unit; and
a plurality of output devices, each output device coupled to a slave terminal and operative to communicate to the player the receipt of a winning or losing play and the amount won.

17. The gaming system network defined in claim 16, wherein the communication interface comprises a local area network.

18. A gaming system network comprising:
a central game processor for generating a plurality of finite pools of game plays, each finite pool having a predetermined number of winning and losing game play records, each game play record comprising an indication of whether the particular play constitutes a winning play and the amount won;
a plurality of master processing units, each master processing unit coupled to the central game processor through a first communication interface and operative to receive the game play records from the central game processor;
a memory device coupled to each master processing unit, the memory device operative to store at least one finite pool of game play records, each finite pool of game play records containing a predefined number of winning and losing game play records wherein each game play record contains an indication of whether the particular play constitutes a winning play and the amount won;
a second communication interface coupled to each master processing unit;
a plurality of slave terminals, each slave terminal coupled to the second communication interface to receive game play records from the master processing unit in response to a game play request received from a player;
a plurality of player-controlled selection devices, each player-controlled selection device coupled to a slave terminal and operative to transmit game play requests from the player to the master processing unit; and
a plurality of output devices, each output device coupled to a slave terminal and operative to communicate to the player the receipt of a winning play and the amount won.

* * * * *

UNITED STATES PATENT AND TRADEMARK OFFICE
CERTIFICATE OF CORRECTION

PATENT NO. : 5,324,035
DATED : June 28, 1994
INVENTOR(S) : Earl D. Morris et al.

It is certified that error appears in the above-indentified patent and that said Letters Patent is hereby corrected as shown below:

Column 30, line 3 , after "plays" insert --;--.

Signed and Sealed this

Thirty-first Day of October 1995

Attest:

BRUCE LEHMAN

*Attesting Officer*      *Commissioner of Patents and Trademarks*